United States Patent [19]

Doyle et al.

[11] Patent Number: 6,033,804
[45] Date of Patent: Mar. 7, 2000

[54] HIGHLY CONDUCTIVE ION EXCHANGE POLYMER AND PROCESS

[75] Inventors: Christopher Marc Doyle, Newark; Mark Evan Lewittes, Wilmington, both of Del.; Stephen Albert Perusich, Auburn, Ala.; Govindarajulu Rajendran; Mark Gerrit Roelofs, both of Hockessin, Del.

[73] Assignee: E. I. du Pont de Nemours and Company, Wilmington, Del.

[21] Appl. No.: 08/961,731

[22] Filed: Oct. 31, 1997

Related U.S. Application Data

[60] Provisional application No. 60/052,550, Jul. 15, 1996, provisional application No. 60/042,186, Apr. 2, 1996, and provisional application No. 60/029,865, Nov. 1, 1996.

[51] Int. Cl.[7] .......................... H01M 4/62; H01M 10/40; B05D 5/06
[52] U.S. Cl. ....................... 429/212; 429/314; 429/316; 427/58; 427/220; 427/336
[58] Field of Search .............................. 429/314, 316, 429/212; 427/58, 220, 336

[56] References Cited

U.S. PATENT DOCUMENTS

| | | | |
|---|---|---|---|
| 3,282,875 | 11/1966 | Connolly et al. | 260/29.6 |
| 4,453,991 | 6/1984 | Grot | 156/94 |
| 5,330,856 | 7/1994 | Gonzales | 429/212 |
| 5,525,443 | 6/1996 | Okuno et al. | 429/194 |
| 5,548,055 | 8/1996 | Narang et al. | 528/25 |

FOREIGN PATENT DOCUMENTS

| | | | |
|---|---|---|---|
| WO 96/21953 | 7/1996 | WIPO | H01M 6/18 |

OTHER PUBLICATIONS

T. A. Zawodzinski, Jr., et al., Water Iptake by and Transport Through Nafion® 117 Membranes, *J. Electrochem. Soc.,* 140(4), 1041–1047, Apr., 1993.

M. Guglielmi et al., Ionic conductivity of Perfluorinated ionomer solutions and gels, *J. of Applied Electrochemistry,* 19, 167–173, 1989 (Month unknown).

P. Aldebert et al., Ionic Conductivity of Bulk, Gels and Solutions of Perfluorinated Ionomer Membranes, *Polymer Journal,* 23(5), 399–406, 1991 (Month unknown).

M.B. Armand, Ionically Conductive Polymers, *Solid State Batteries,* 63–75, 1985.

Yuka Miura et al., Effects of Water and Alcohols on Molecular Motion of Perfluorinated Ionomer Membranes, *Thermochimica Acta,* 163, 161–168, 1990 (Month unknown).

G. Gebel et al., Swelling study of perfluorosulphonated Ionomer membranes, *Polymer,* 34(2), 333–339, 1993 (Month unknown).

Yoshitsugu Sone et al., Proton Conductivity of Nafion 117 as Measured by a Four–Electrode AC Impedance Method, *J. Electrochem. Soc.,* 143(4), 1254–1259, Apr., 1996.

Gary E. Wnek et al., New Hydrocarbon Proton Exchange Membranes Based on Sulfonated Styrene–Ethylene/Butylene–Styrene Triblock Copolymers, *Electrochemical Society Proceedings ,* 95–23, 247–250 (Date unknown).

J.M. Tarascon et al., New electrolyte compositions stable over the 0 to 5 V voltage range and compatible with the $Li_{1+x}Mn_2O_4$/carbon Li–ion cells, *Solid State Ionics,* 69, 293–305, 1994 (Month unknown).

Perron et al., Specific Conductivity of Lithium bis(trifloromethane–sulfonyl)imide (LiTFSI) in Mixtures of Aprotic Solvents, Abstract 64 of Battery/Energy Technology Joint General Session of Meeting Abstracts, Electrochemical Society May 4–9, 1997 meeting, Montreal, Quebec, Canada.

Abstract: Derwent Publications, XP–002056447, (For Japanese 61–67789, Apr. 1986).

Abstract: Derwent Publications, XP–002056448, (For Japanese 2–198642, Aug. 1990).

*Primary Examiner*—Stephen Kalafut

[57] ABSTRACT

Disclosed is a highly conductive polymer electrolyte membrane and a process for producing it. This invention also describes batteries which employ the polymer electrolyte membrane of this invention.

31 Claims, 2 Drawing Sheets

HIGHLY CONDUCTIVE ION EXCHANGE POLYMER AND PROCESS

This application claims the priority benefit of U.S. Provisional Application Ser. No. 60/052,550, filed Jul. 15, 1996 and from U.S. Provisional Application Ser. No. 60/042,186, filed Apr. 2, 1996 and from U.S. Provisional Application Ser. No. 60/029,865 filed Nov. 1, 1996.

FIELD OF THE INVENTION

This invention relates to highly conductive polymer electrolyte membranes and a process for producing them. This invention relates, more specifically, to lithium ion exchange polymer electrolyte membranes which display conductivity greater than $10^{-4}$ S/cm in non-aqueous environments. This invention also relates to batteries which employ the polymer electrolyte membranes of this invention.

TECHNICAL BACKGROUND OF THE INVENTION

Guglielmi et al., J. Appl. Electrochem., 19, 167 (1989) disclose perfluorinated lithium ion exchange polymer electrolyte gels. Gels were formed by dissolving Nafion® 1100 perfluorinated ionomer resin in n-methyl formamide (NMF), propylene carbonate (PC), and triethylphosphate (TEP) are disclosed. Conductivities in excess of $10^{-4}$ S/cm were obtained. Heating of the solutions to 80° C. is also disclosed, along with a concomitant increase in specific conductance to ca. $7.5 \times 10^{-3}$ S/cm measured at the elevated temperature. The solvent to polymer ratio in the gels was in excess of 3:1 by weight. The gels disclosed therein are not capable of being formed into free-standing membranes.

Aldbert et al., Polymer Journal, 23, 399 (1991) disclose perfluorinated sulfonate ionomers wherein the cations are hydrogen, lithium, sodium, and rubidium, and wherein the ionomer is in the form of a solution, or a solvent-swollen membrane. A 50/50 mixture of PC and dimethoxyethane is shown to be particularly effective at increasing the conductivity of a gel solution formed therefrom with lithium ionomer form of Nafion® 1100. Membranes formed of the lithium ionomer form of Nafion® 1100 are swollen with PC, NMF, and ethanol. It is disclosed that after ca. 10 minutes of solvent soaking at room temperature, the specific conductivity of the membrane exhibits no further increase. Specific conductivity as high as $1.8 \times 10^{-3}$ S/cm is found for a membrane soaked in NMF for less than 10 minutes. Membranes swollen in PC provide a specific conductivity of $6 \times 10^{-5}$ S/cm. The former solvent cannot be used in lithium batteries due to its protic nature. Propylene carbonate is known in the art to be a good lithium battery solvent, but the conductivity disclosed by Aldbert et. al. in Nafion® 1100 membranes is less than $10^{-4}$ S/cm, too poor to be of practical utility. Solvent to polymer ratio in the solvent swollen membranes was less than 1:1.

In Zawodzinski et al., J. Electrochem. Soc., 140, 1041 (1993) a Nafion® 1100 membrane is heated to 105° C. prior to exposure to water at room temperature. The effect of the heating is to prevent the achievement of maximum water absorption, thus decreasing the conductivity of the water-swollen membrane.

M. B. Armand, "Ionically Conductive Polymers", Solid State Batteries, Sequeira and Hopper, eds. (1985), discloses the lithium ionomer form of Nafion® 1100 soaked in PC for 48 hours, developing a specific conductivity of $2.1 \times 10^{-5}$ S/cm. Armand also discloses that the conductivity of the solvent soaked membrane increases with temperature according to a free volume model. As with Aldbert et al., the conductivity disclosed here is too poor to be of practical utility in commercial lithium batteries.

Miura et al, Memoirs of Faculty of Tech. Tokyo Metropolitan Univ., No. 40, pp 4349ff, 1990, describe metastable changes in the ion cluster morphology of perfluorinated ionomers upon swelling in ethanol followed by drying.

Gebel et al, Polymer, v. 34, pp 333ff, 1993, disclose perfluoro lithium ionomer membranes swollen in numerous solvents including propylene carbonate and phosphates. Phosphates are disclosed to provide particularly large amounts of swelling. The necessity of soaking in some solvents, such as propylene carbonate, for a period of weeks is disclosed. There is no discussion of ionic conductivity.

Perron et al., Specific Conductivity of Lithium bis (trifloromethane-sulfonyl)imide (LiTFSI) in Mixtures of Aprotic Solvents, Abstract 64 of Battery/Energy Technology Joint General Session of Meeting Abstracts, Electrochemical Society May 4–9, 1997 meeting, Montreal, Quebec, Canada, disclose dimethoxyethane (DME) as a good solvent for lithium salts providing high specific conductivity to solutions thereof. Solutions of non-polymer lithium salts in certain combinations of aprotic solvents are disclosed to provide particularly high specific conductivity in cases of limited solubility of the electrolyte membrane in the solvent which affords higher conductivity. Mixtures of DME with propylene carbonate are disclosed. Small amounts of PC do not significantly alter the conductivity of an electrolyte solution in DME.

Nonaqueous liquid electrolytes for lithium batteries are disclosed in Okuno et al, U.S. Pat. No. 5,525,443. Disclosed are lithium salt solutions formed with solvent combinations of linear and cyclic esters the cyclic ester being selected from the group consisting of ethylene carbonate, propylene carbonate, butylene carbonate, and gamma-butyrolactone, and the linear ester being selected from the group consisting of diethyl carbonate, dimethyl carbonate, ethyl formate, methyl formate, ethyl acetate, methyl acetate, and dimethyl sulfoxide.

SUMMARY OF THE INVENTION

This invention provides a highly fluorinated lithium ion exchange polymer electrolyte membrane (FLIEPEM) which exhibits ionic conductivity in non-queous media of at least $10^{-4}$ S/cm. The FLIEPEM of this invention is a so-called single ion conductor, and is thereby not subject to concentration polarization in electrochemical applications such as batteries. This invention provides for the first single-ion conductor in the form of an ionically conductive polymer electrolyte membrane which exhibits ionic conductivity in excess of $10^{-4}$ S/cm and the first lithium battery made therewith.

This invention provides for a highly fluorinated lithium ion exchange polymer electrolyte membrane (FLIEPEM) exhibiting a conductivity of at least 0.1 mS/cm comprising a highly fluorinated lithium ion exchange polymer membrane (FLIEPM), the polymer having pendant fluoroalkoxy lithium sulfonate groups, and wherein the polymer is either completely or partially cation exchanged; at least one aprotic solvent imbibed in said membrane, the FLIEPEM being characterized by a conductivity parameter value (CPV), as hereinbelow defined, of 0.3 mS/cm or greater.

Further provided is a process for forming a FLIEPEM, the process comprising contacting a FLIEPM with at least one aprotic solvent, in a dry environment, in the temperature range of −40 to 200° C., the solvent and polymer combination having a CPV of at least 0.3 mS/cm, to form a FLIEPEM with a conductivity of at least 0.1 mS/cm.

This invention further provides for highly fluorinated lithium ion exchange polymer electrolyte membrane (FLIEPEM) comprising a highly fluorinated lithium ion exchange polymer membrane, the polymer having pendant fluoroalkoxy lithium sulfonate groups, wherein the polymer is either completely or partially cation exchanged; and at least one aprotic solvent imbibed in said polymer membrane the FLIEPEM being characterized by a conductivity of at least 0.1 mS/cm, the aprotic solvent or solvents being selected from the group consisting of dimethyl formamide (DMF), dimethoxyethane (DME), ethylene carbonate (EC), propylene carbonate (PC), dimethyl sulfoxide (DMSO), gamma-butyrolactone (GBL), N,N'-dimethylpropyleneurea (DMPU), 1-methyl-2-pyrrolidone (NMP), dimethyl acetamide (DMA), N,N'-dimethyl butyramide (DMB), triethylphosphate (TIEPP), n,n'-di-n-butylacetamide (DBA), and mixtures thereof; or a mixture of PC with a solvent selected from the group consisting of DME, EC, GBL, dimethyl carbonate (DMC), and acrylonitrile (ACN); or being a mixture of EC with a solvent selected from the group consisting of DME, GBL, DMSO, diethoxyethane (DEE), and DMC; or being a mixture of NMP with a solvent selected from the group consisting of DME, DMSO, GBL, DMF, and DMA; or being a mixture of GBI with DEE or DME; or being a mixture of EC and DME with a solvent selected from the group consisting of diethyl carbonate (DEC), DMC, and PC; or being a mixture of DMF and a solvent selected from the group consisting of DMA, DMSO, NMP, methyl glycolate (MG), GBL, TEP, EC, DME, PC, methyl formate (MF), tetrahydrofuran (THF), sulfolane (SULF), DMC, ACN, methyl acetate (MA), DEC, 1,3-dioxolane (DIOX), DEE, ethyl acrylate (EA), and dimethyl sulfite (DMSU); or being a mixture of DMA and a solvent selected from the group consisting of DMSO, NMP, MG, GBL, TEP, EC, DME, PC, MF, THF, SULF, DMC, ACN, MA, DEC, DIOX, DEE, EA, and DMSU; or being a mixture of DMSO and a solvent selected from the group consisting of NMP, MG, GBL, TEP, EC, DME, PC, MF, THF, SULF, DMC, ACN, MA, DEC, DIOX, DEE, EA, and DMSU; or being a mixture of NMP and a solvent selected from the group consisting of MG, GBL, TEP, EC, DME, PC, MF, THF, SULF, DMC, ACN, MA, DEC, DIOX, DEE, EA, and DMSU; or being a mixture of MG and a solvent selected from the group consisting of GBL, TEP, EC, DME, PC, MF, THF, SULF, DMC, ACN, MA, DEC, DIOX, DEE, EA, and DMSU; or being a mixture of GBL and a solvent selected from the group consisting of TEP, EC, DME, PC, MF, THF,ACN, MA, DEC, DIOX, and EA; or being a mixture of TEP and a solvent selected from the group consisting of EC, PC, SULF, ACN, and DMSU; or being a mixture of EC and DME; or being a mixture of DME and either ACN or DMSU or being a mixture of EC, DMF and a solvent selected from the group consisting of DMA, DMSO, NMP, MG, GBL, TEP, DME, PC, MF, THF, SULF, DMC, ACN, MA, DEC, DIOX, DEE, EA, and DMSU; or being a mixture of EC, DMA and a solvent selected from the group consisting of DMSO, NMP, MG, GBL, TEP, DME, PC, MF, THF, SULF, DMC, ACN, MA, DEC, DIOX, DEE, EA, and DMSU; or being a mixture of EC, DMSO and a solvent selected from the group consisting of NMP, MG, GBL, TEP, DME, PC, MF, THF, SULF, DMC, ACN, MA, DEC, DIOX, DEE, EA, DMSU; or being a mixture of EC, NMP and a solvent selected from the group consisting of MG, GBL, TEP, DME, PC, MF, THF, SULF, DMC, ACN, MA, DEC, DIOX, DEE, EA, and DMSU; or being a mixture of EC, MG and a solvent selected from the group consisting of GBL, TEP, DME, PC, MF, THE, SULF, DMC, ACN, MA, DEC, DIOX, DEE, EA, and DMSU; or being a mixture of EC, GBL and a solvent selected from the group consisting of TEP, DME, PC, MF, THF, SULF, DMC, ACN, MA, DEC, DIOX, DEE, EA, and DMSU; or being a mixture of EC, TEP and a solvent selected from the group consisting of DME, PC, MF, THF, SULF, DMC, ACN, MA, DEC, DIOX, DEE, EA, and DMSU; or being a mixture of EC, DME and a solvent selected from the group consisting of MF, THF, SULF, DMC, ACN, MA, DEC, DIOX, DEE, EA, and DMSU; or being a mixture of EC, MF and either DEC or DIOX; or being a mixture of EC, THF and either DEC or DIOX; or being a mixture of EC, DMC and DIOX; or being a mixture of EC, DEC and DIOX; or being a mixture of PC, DMF and a solvent selected from the group consisting of DMA, DMSO, NMP, MG, GBL, TEP, EC, DME, MF, THF, SULF, DMC, ACN, MA, DEC, DIOX, DEE, EA, and DMSU; or being a mixture of PC, DMA and a solvent selected from the group consisting of DMSO, NMP, MG, GBL, TEP, EC, DME, MF, THF, SULF, DMC, ACN, MA, DEC, DIOX, DEE, EA, and DMSU; or being a mixture of PC, DMSO and a solvent selected from the group consisting of NMP, MG, GBL, TEP, EC, DME, MF, THF, SULF, DMC, ACN, MA, DEC, DIOX, DEE, EA, and DMSU; or being a mixture of PC, NMP and a solvent selected from the group consisting of MG, GBL, TEP, EC, DME, MF, THF, SULF, DMC, ACN, MA, DEC, DIOX, DEE, EA, and DMSU; or being a mixture of PC, MG and a solvent selected from the group consisting of GBL, TEP, EC, DME, MF, THF, SULF, DMC, ACN, MA, DEC, DIOX, DEE, EA, and DMSU; or being a mixture of PC, GBL and a solvent selected from the group consisting of TEP, EC, DME, MF, THF, DMC, ACN, MA, DEC, DIOX, DEE, EA, and DMSU; or being a mixture of PC, TEP and a solvent selected from the group consisting of EC, DME, MF, THF, SULF, DMC, ACN, MA, DEC, DIOX, DEE, EA, and DMSU; or being a mixture of PC, DME and a solvent selected from the group consisting of THF, DEC, and DIOX; or being a mixture of DMC, DMA and a solvent selected from the group consisting of DMSO, NMP, MG, GBL, TEP, EC, DME, PC, MF, THF, SULF, ACN, MA, DEC, DIOX, DEE, EA, and DMSU; or being a mixture of DMC, DMSO and a solvent selected from the group consisting of NMP, MG, GBL, TEP, EC, DME, PC, MF, THE, SULF, ACN, MA, DEC, DIOX, DEE, EA, and DMSU; or being a mixture of DMC, NMP and a solvent selected from the group consisting of MG, GBL, TEP, EC, DME, PC, MF, THF, SULF, ACN, MA, DEC, DIOX, DEE, EA, and DMSU; or being a mixture of DMC, MG and a solvent selected from the group consisting of GBL, TEP, EC, DME, PC, MF, THF, SULF, ACN, MA, DEC, DIOX, DEE, EA, and DMSU; or being a mixture of DMC, GBL and a solvent selected from the group consisting of TEP, EC, DME, PC, ME, THF,ACN, MA, DEC, DIOX, and EA; or being a mixture of DMC, TEP and a solvent selected from the group consisting of EC, PC, SULF, and ACN; or being a mixture of DMC, EC and either DME or DIOX; or being a mixture of DMC, DME and ACN or being a mixture of DME, DMF and a solvent selected from the group consisting of DMA, DMSO, NMP, MG, GBL, TEP, EC, PC, MF, THF, SULF, DMC, ACN, MA, DEC, DIOX, DEE, EA, and DMSU; or being a mixture of DME, DMA and a solvent selected from the group consisting of DMSO, NMP, MG, GBL, TEP, EC, PC, MF, THF, SULF, DMC, ACN, MA, DEC, DIOX, DEE, EA, and DMSU; or being a mixture of DME, DMSO and a solvent selected from the group consisting of NMP, MG, GBL, TEP, EC, PC, MF, THF, SULF, DMC, ACN, MA, DEC, DIOX, DEE, EA, and DMSU; or being a mixture of DME, NMP and a solvent selected from the group consisting of MG, GBL, TEP, EC, PC, MF, THF, SULF, DMC, ACN, MA, DEC, DIOX, DEE, EA, and DMSU; or being a mixture of DME, MG and a solvent selected from the group consisting of GBL, TEP, EC, PC, MF, THF, SULF, DMC, ACN, MA, DEC, DIOX, DEE, EA, and DMSU; or being a mixture of DME, GBL and a solvent selected from the group consisting of TEP, EC, PC, MF, THF, SULF, DMC, ACN, MA, DEC, DIOX, DEE, EA, and DMSU; or being a mixture of DME, TEP and a solvent selected from the group consisting of EC, PC, SULF, ACN, and DMSU; or being a mixture of DME, EC and a solvent selected from the group consisting of MF, THF, SULF, DMC, ACN, MA, DEC, DIOX, DEE, EA, and DMSU; or being a mixture of DME, PC and a solvent selected from the group consisting of THF, DEC, and DIOX; or being a mixture of DME, MF and either SULF or ACN; or being a mixture of DME, THF and either SULF or ACN; or being a mixture of DME, SULF and either DEC or DIOX; or being a mixture of DME, DMC and ACN; or being a mixture of DME, ACN and a solvent selected from the group consisting of MA, DEC, DIOX, DEE, EA, and DMSU.

Further provided is a process for forming a FLIEPEM, the process comprising contacting a FLIEPM with at least one aprotic solvent, in a dry environment, in the temperature range of −40 to 200° C., to form a FLIEPEM with a conductivity of at least 0.1 mS/cm; the solvent being selected from the solvents in the paragraph immediately hereinabove.

This invention further provides for a lithium ion battery comprising one or more electrochemical cells comprising a positive electrode, a negative electrode, a FLIEPEM having a conductivity of at least 0.1 mS/cm disposed between the positive and negative electrodes and in ionically conductive contact therewith, and a means for connecting the electrodes with an external electrical load or source.

This invention still further provides for a porous electrode comprising particles of an electrode-active material, a highly fluorinated lithium ion exchange polymer and at least one aprotic solvent suitable for the practice of the invention.

This invention still further provides for a process for forming an electrode the process comprising forming a solution or dispersion of a highly fluorinated polymer having a pendant fluoroalkoxy lithium sulfonate or sulfonyl fluoride group; mixing into the solution or dispersion an electrode active material in particulate form to form a coating paste; forming a film from the coating paste; coalescing the polymer in the film by the application of heat; and, if the pendant group is a sulfonyl fluoride, hydrolyzing the polymer to a lithium ionomer.

BRIEF DESCRIPTION OF TI IE DRAWINGS

DETAILED DESCRIPTION OF THE INVENTION

Figure 1:
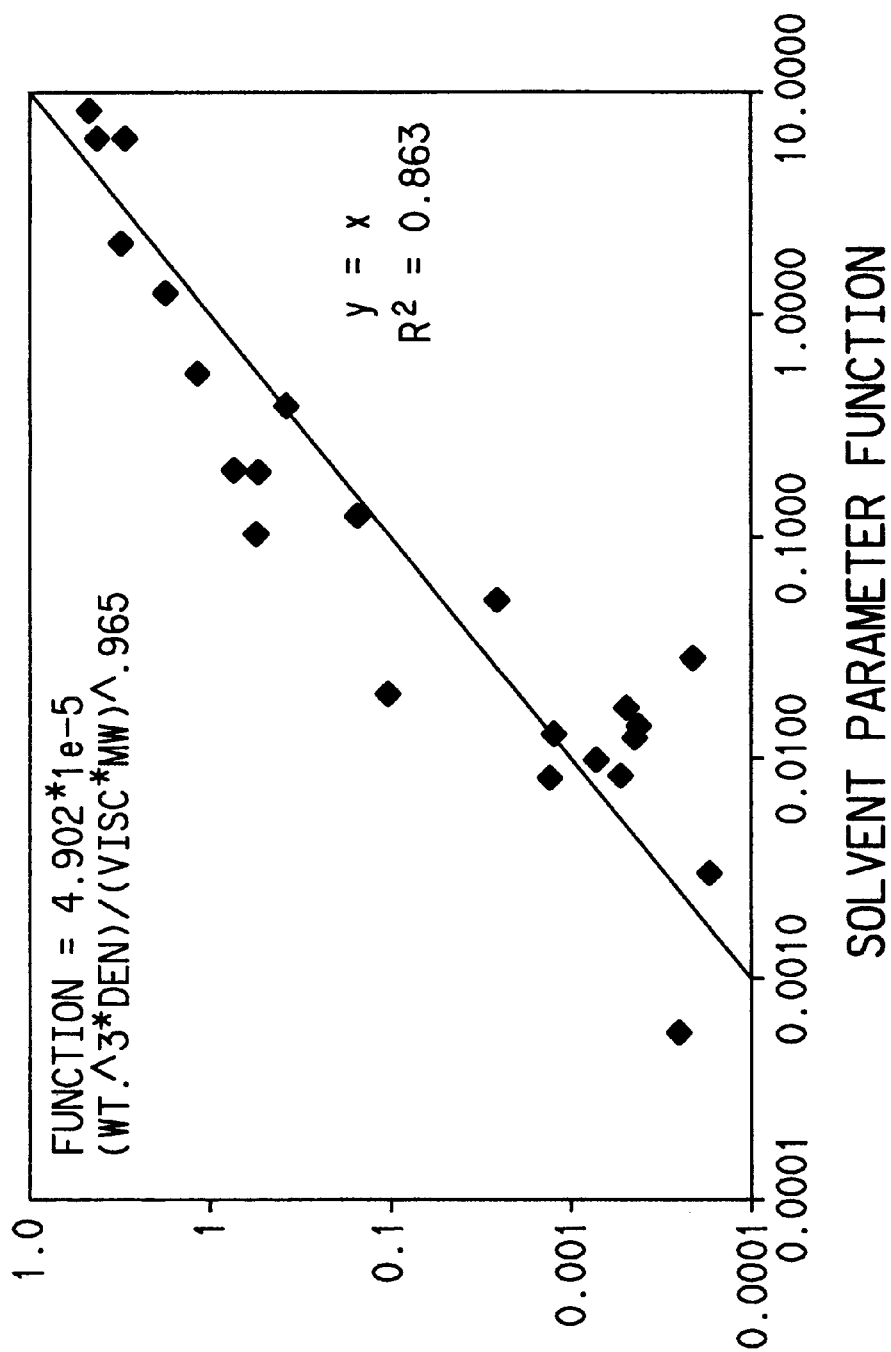
FIG. 1 shows Nafion® (1100 EW) conductivity correlation with solvent parameters.
Figure 2:
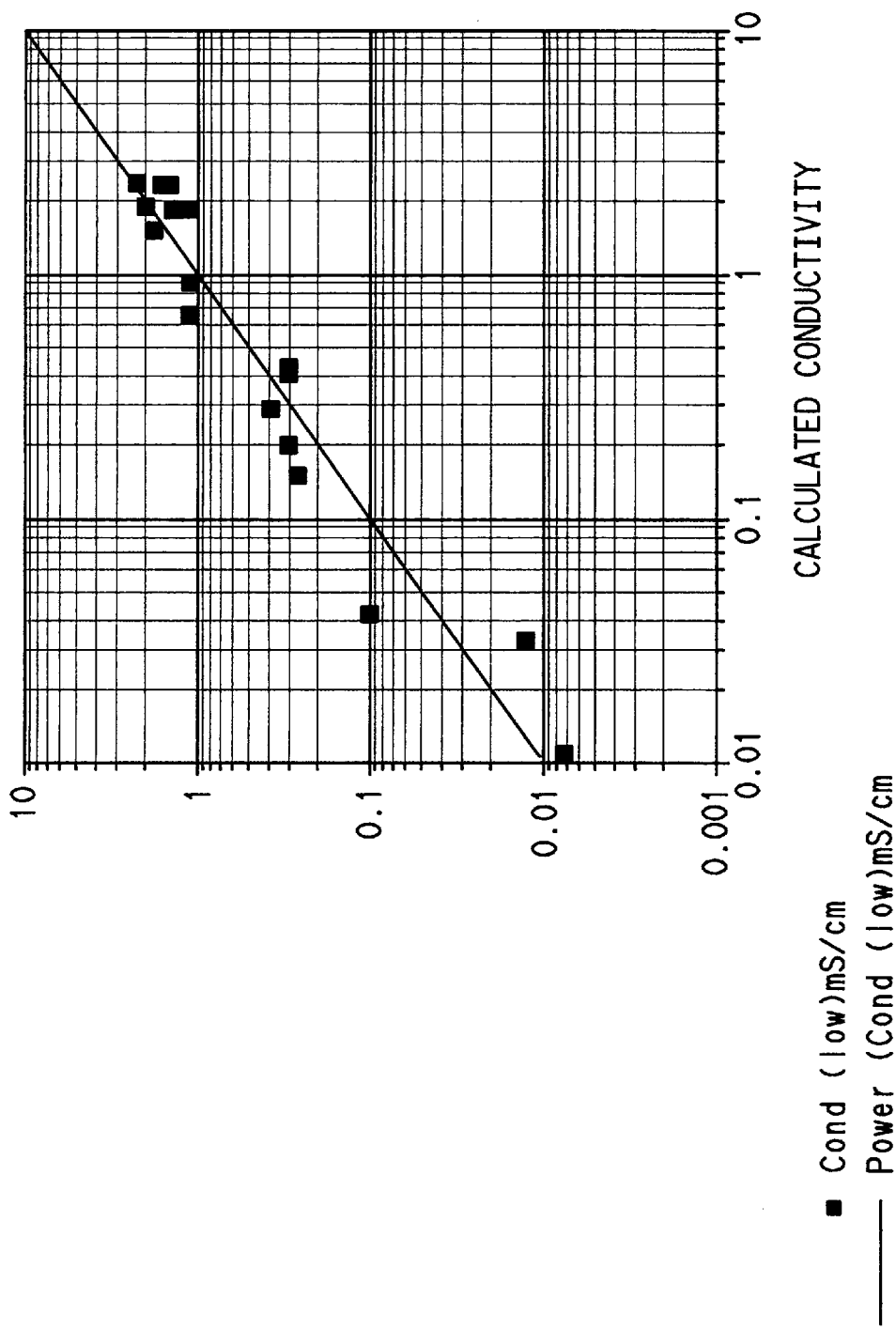
FIG. 2 shows correlation between calculated conductivity and measured conductivity for Lithiated Nafion® films swollen in binary solvent mixtures.

Ion exchange polymers are known in the art as single-ion conductors and therefore not subject to concentration polarization in electrochemical applications. However, until the present invention was made, no ion exchange polymer electrolyte membrane had been discovered which was suitable for use in lithium batteries. Lithium batteries offer the possibility of achieving both high power and high energy, but impose stringent requirements on the electrolyte membrane, and particularly the application of solid polymer electrolyte membranes. These include voltage stability to the highly oxidative and reductive conditions characteristic of lithium batteries, and a room temperature conductivity of at least $10^{-4}$ S/cm in the absence of protic species. No such combination has been previously known in an ion exchange polymer electrolyte membrane, nor has any method for producing lithium ion exchange polymer electrolyte membranes therefrom been proposed. With the surprising discovery of the high conductivity FLIEPEM of this invention, a practical barrier to the development of lithium and lithium-ion batteries has been overcome.

For the purposes of this invention, the term "highly fluorinated" means that at least 90 mole-% of the hydrocarbon hydrogen of the analogous non-fluorinated polymer have been replaced by fluorine. This invention provides for a highly fluorinated, preferably perfluorinated, lithium ion exchange polymer electrolyte membrane (FLIEPEM) comprising a highly fluorinated, preferably perfluorinated, lithium ion exchange polymer membrane (FLIEPM) imbibed with at least one aprotic solvent, the solvent having a conductivity parameter value (CPV), as hereinbelow defined, of 0.3 or greater.

For the purposes of this invention, the term "conductivity" used herein refers specifically to ionic conductivity as determined using the so-called four-point probe technique described in an article entitled "Proton Conductivity of Nafion® 117 As Measured by a Four-Electrode AC Impendance Method" by Y. Sone et al., J. Electrochem. Soc., 143,1254 (1996). The method as described applies to aqueous electrolyte membranes. The method was modified for purposes of obtaining the measurements reported herein by placing the apparatus described in a sealed glove box purged with dry nitrogen in order to minimize any exposure to water. The method was also modified by substituting parallel linear probes traversing the full width of the test specimen for the point probes employed in the published method.

The polymer of the present invention is preferably a fluoro-olefin homopolymer or copolymer having pendant lithium sulfonate groups the polymer being completely or partially cation exchanged. The pendant groups are preferably lithium salts of fluoroalkoxy sulfonates. The term "copolymer" as used herein encompasses terpolymers.

The preferred polymer of the invention is a copolymer of a non-ionic fluoro-olefin monomer and up to 50 mol-%, preferably up to 30 mol-%, most preferably up to 20 mol-%, of an ionic fluoro-olefin having pendant groups comprising lithium salts of fluoroalkoxy sulfonates. Suitable non-ionic fluoro-olefins include tetrafluoroethylene (TFE), hexafluoropropylene, vinyl fluoride, vinylidine fluoride, trifluoroethylene, chlorotrifluoroethylene, perfluoro (alkyl vinyl ether), and mixtures thereof. Suitable ionic fluoro-olefins include a variety of fluorinated vinyl ethers with functional groups which can provide the desired side chain in the polymer. Preferably, the polymer in accordance with the invention is a copolymer of tetrafluoroethylene and a perfluorovinyl ether lithium sulfonate.

Preferred polymers for use in the present invention are copolymers of TFE with up to 50 mol-% of a perfluorovinyl monomer having a pendant group represented by the formula:

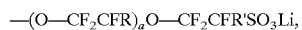

wherein R and R' are independently selected from F, Cl or a perfluorinated alkyl group having 1 to 10 carbon atoms, a=0, 1 or 2. Most preferably, R is $CF_3$, R' is F, and a=0 or 1. The preferred polymers include, for example, polymers disclosed in U.S. Pat. No. 3,282,875 and in U.S. Pat. Nos. 4,358,545 and 4,940,525, which are herein incorporated by reference.

As disclosed in the references hereinabove cited, the preferred polymers of the invention are prepared by copolymerization of tetrafluoroethylene (TFE) and the perfluorinated vinyl ether

where "a"=0 or 1, respectively, perfluoro (3-oxa-4pentene sulfonyl fluoride) or perfluoro(3,6-dioxa-4-methyl-7-octenesulfonyl fluoride), followed by conversion to sulfonate groups by hydrolysis of the sulfonyl fluoride groups and lithium ion exchanging if needed to convert to the desired form.

In the art of ion exchange polymer technology, the concentration of ionically conducting units is expressed in terms of so-called equivalent weight. Equivalent weight, expressed as grams/equivalent (g/eq.), refers to the number of grams of polymer required to supply one equivalent of ionic functionality and may be determined by titration methods or spectroscopic methods. See, for example the titration methods mentioned in Gary E. Wnek et al., "New Hydrocarbon Proton Exchange Membranes Based On Sulfonated Styrene-Ethylene/Butylene-Styrene Triblock Copolymers", Electrochemical Society Proceedings Volume 95–23, pages 247–250.

The perfluoro ion exchange polymer preferred for use in this invention is characterized as being of equivalent weight in the range of 600 to 1500 g/equivalent with equivalent weight of 900 to 1200 g/equivalent preferred.

Other things being equal, lower equivalent weight corresponds to higher conductivity. There are two reasons for this effect. One is simply that there is a higher concentration of ionic sites per unit weight of polymer. The other is that it has been found in the practice of the present invention that the lower equivalent weight membranes, being of lower crystallinity, exhibit a higher solvent absorption capacity per unit weight of membrane than do those of higher equivalent weight.

In the perfluoro ion exchange polymer preferred for use in this invention, lithium groups constitute 1 to 100%, preferably 100% of the total pendant metal cation exchange groups. Less than 100% conversion to the lithium cation will result in a higher effective equivalent weight. Less than 100% conversion of a fully-hydrolyzed, acid-exchanged form to the lithium-exchanged form leaves highly acid groups (H+) which will degrade other cell components and the active hydrogens will be reduced at the anode to hydrogen gas, depriving the cell of electrochemically active lithium ions.

Any method of hydrolysis known in the art is acceptable in the practice of this invention for conversion of the perfluorinated ion exchange polymer to the perfluorinated lithium ion exchange polymer. One method found to be satisfactory for converting an unhydrolyzed sulfonyl fluoride ($-SO_2F$) precursor film to the lithium ionomer comprises:

1. Positioning the unhydrolyzed film in a beaker on a hot plate.
2. Completely immersing the membrane in an excess of 1.0 M LiOH in a 1:4 DMSO:water solution and heating to T=60 to 80° C. for ca. two hours.
3. Removing the thus produced lithium ionomer from the beaker and rinsing in distilled water to remove excess caustic.
4. Heating the membrane in a beaker containing deionized water for two or more hours at T=60 to 80° C.
5. Heating the membrane in a vacuum oven at ~100° C. and with a $N_2$ purge to dry overnight.

DMSO is the preferred solvent for the hydrolysis and lithiation step, but other solvents such as methanol may also be used.

The degree of hydrolysis may be in the range of 1 to 100% of the pendant groups in the perfluorinated ion exchange polymer; 100% hydrolysis is preferred.

The Li ionomer is then contacted with an aprotic solvent of the invention, preferably until equilibrium solvent uptake is achieved. It will be understood by the practitioner of the art, and as hereinbelow shown, that the amount of solvent contained within the polymer after contacting will depend upon the exposure conditions and the particular nature of the solvent/polymer interaction. As will be seen in the specific embodiments hereinbelow described, different membrane/solvent combinations require different exposure conditions to achieve the objects of the invention.

The boiling point of the solvent is not critical, but the solvent must remain a liquid under the anticipated conditions of use. It is expected that the freezing point of a solvent is lowered by the FLIEPM, thus Li-ion mobility is expected in these systems below the freezing point of the solvent. Thus, a boiling point of at least 30° C. is preferred, with a boiling point of at least 50° C. most preferred. If the cell is pressurized, temperatures in excess of the atmospheric pressure boiling point may be employed.

It has been found that the conductivity of the preferred FLIEPEM of the invention can be predicted with a high degree of sensitivity from a computation of what is designated herein the "conductivity parameter value", a function of solvent-related and polymer parameters. The combinations of polymers and solvents, including mixtures of solvents, suitable for use in the practice of the present invention are characterized by a conductivity parameter value (CPV) of at least 0.3 mS/cm. It has been found in the practice of the invention that for an FLIEPEM imbibed with a single solvent the value of CPV can be determined from the equation $$CPV\ (mS/cm) = 4.902 \times 10^{-5} ((W^3 \cdot D)/(\eta_t \cdot MW))^{0.965} \cdot [2.0092 - (0.0012 \cdot EW)]$$

where $$W = 100[(W_w - W_d)/W_d]$$

where $W_w$ is the weight of the membrane plus the solvent absorbed by the membrane and $W_d$ is the weight of the membrane prior to solvent absorption. "D" is the density of the solvent in g/cc; "η" is the room temperature viscosity of the solvent in centipoise; and, "MW" is the molecular weight of the solvent in g/mole. "EW" is the equivalent weight of the hydrolyzed membrane in grams per equivalent. D, η, and MW are all available from published sources. W is determined experimentally for the membrane in question.

The equation for CPV without the bracketed correction factor for equivalent weight, was determined by fitting the experimental data, provided in the specific embodiments hereinbelow, for a copolymer of TFE with perfluoro(3,6-dioxa-4-methyl-7-octenesulfonyl fluoride) having an equivalent weight of ca. 1100 g/eq. As will be obvious to one of skill in the art, there is some inherent uncertainty to all experimental correlations. Nevertheless, it has been found in the practice of this invention that there is a 90% probability that a membrane characterized by CPV of 0.3 or greater will exhibit a conductivity of $>10^{-4}$ S/cm, the object of the invention. One of skill in the art will further recognize that some membranes which exhibit conductivity greater than 0.1 mS/cm, will be characterized by a CPV below 0.3 mS/cm.

The term "CPV" as used herein encompasses FLIEPEMs imbibed with just a single aprotic solvent and FLIEPEMs imbibed with a mixture of aprotic solvents. Different methods for determining CPV for single solvent membranes and solvent mixture membranes are disclosed herein. However, in both cases, CPV is a predicted value of the conductivity based upon membrane and solvent parameters, and the significance of CPV for single solvent and solvent mixture membranes is the same for purposes of this invention.

FIG. 1 depicts graphically the relationship of the experimental data, hereinbelow disclosed in the specific embodiments of the present invention, to the line defined by the equation for CPV, without the bracketed correction for equivalent weight.

Li-sulfonate ionomers which differ in equivalent weight and/or the perfluoroolefin fluoroalkoxy sulfonate comonomer exhibit different functional dependence of conductivity vs. the solvent parameters in the CPV equation, as indicated by the factor within brackets in the equation for CPV. The correction factor for equivalent weight was determined experimentally.

The weight uptake of solvents in a membrane of choice may readily be determined with a minimum expenditure of time using simple laboratory equipment. Specimens of the membrane need simply to be weighed prior to solvent exposure, then exposed to the candidate solvent under anhydrous conditions for exposure times in the range of 10 minutes to 1000 hours and at exposure temperatures in the range of room temperature to 230° C., preferably room temperature to 90° C., and finally re-weighed after removal from the solvent bath.

It will be apparent to one of skill in the art that the conductivity of the FLIEPEM depends in part upon the weight % uptake of solvent, that for any given solvent and FLIEPM the weight % uptake can be made to vary over a considerable range depending upon the solvent contacting conditions, and therefore that the conductivity achieved with a particular FLIEPEM can be made to vary over a considerable range. The solvents and membranes suitable for the practice of this invention provide conductivity above 0.1 mS/cm under at least some conditions of soaking. In the case of some solvents, only a narrow range of solvent contacting conditions of a particular FLIEPMwill result in a membrane which provides the object of the invention. In other cases, the object of the invention will be provided over a wide range of solvent contacting conditions.

It is found in the art of battery design that often a combination of solvents is advantageous. While it is time consuming but reasonable to perform the necessary measurements of solvent parameters needed to apply the equations hereinabove to determine the conductivity of a solvent candidate for use in a lithium battery, it is particularly onerous to perform all the necessary measurements for screening combinations of solvents. However, by following the method for estimating the conductivity for mixtures, hereinbelow, this can be avoided. Tables 1–5 list the computed values of CPV greater than 0.3 for some solvent combinations in an 1100 g/eq. Li-ionomer formed from a copolymer of TFE and perfluoro(3,6-dioxa-4-methyl-7-octenesulfonyl fluoride). The parameters of the equation for mixtures were obtained by fitting the actual experimental data obtained for certain solvent combinations hereinbelow exemplified.

It is found in the practice of the present invention that the CPV of a lithium ionomer contacted with a combination of solvents can be calculated from the following equation.

$$CPV^{mix}(mS/cm) = 0.893 \left( \sum_i \sigma_i \right)^{1.2346}$$

This equation was determined experimentally using binary solvent mixtures of 1:1 solvent volume ratios. $CPV^{mix}$ is the sum of the contributions of conductivity, $\sigma_i$, for each of the solvents in the mixture in which the Nafion is swollen. $\sigma_i$ is determined from $$\sigma i = \frac{(\sigma_i^{meas} W\%_i^{mix} x_i \eta_i \varepsilon_i^{max})}{W\%_i^{meas} \eta^{mix} \varepsilon_i},$$

where $\sigma_i^{meas}$ is the measured value of the conductivity of the membrane swollen in the with solvent alone of the mixture, in mS/cm; $W\%^{Mix}$ is the percent weight uptake of solvent in the membrane when swollen in the solvent mixture, as calculated in the equation $$W\%^{mix} = 0.06906 \left[ \sum_i (x_i(\varepsilon_i^{max})^{0.5} DN_i^2) \right]^{0.8934},$$

where $x_i$ is determined from the equation $$x_i = \frac{W\%_i^{meas} / MW_i}{\sum_j (W\%_j^{meas} / MW_j)}$$

where the sum over 'j' is the sum over all solvent components in the mixture, $\varepsilon_i$ and $DN_i$ are, respectively, the dielectric constant and donor number; $\eta_i$ is the viscosity of the with component of the solvent mixture in centipoise; $\varepsilon_i^{max}$ is used to indicate the maximum value of all the dielectric constants; i.e., a comparison of the dielectric constants is made for each solvent in the mixture and the maximum value is chosen. Donor Number has been defined by Gutmann (V. Gutmann and E. Wychera, Inorg. Nucl. Chem. Letters, 2, 257 (1966)) as a measure of the basicity of a solvent. It is the negative enthalpy of reaction of the solvent with the Lewis acid antimony pentachloride. $W\%_i^{meas}$ is the measured value of the weight uptake in the membrane when the film is swollen in the with solvent alone; $\eta^{mix}$ is the value of the viscosity in centipoise for the mixture of solvents calculated using the following approximation formula $$\eta^{mix} = \exp\left\{ \sum_i [x_i \ln(\eta_i)] \right\}$$

where "exp" is the exponential function or antilogarithm, $\Sigma$ designates a sum over all the solvents in the mixture, and ln is the natural logarithm function.

TABLE 1

Calculated Conductivity of Binary Solvent Mixtures

| Solvent #1 | Solvent #2 | | | | | | | | | | | |
|---|---|---|---|---|---|---|---|---|---|---|---|---|
| | DMF | DMA | DMSO | NMP | MG | GBL | TEP | EC | DME | PC | MF | THF |
| DMF | 1.67 | 2.00 | 2.18 | 1.55 | 1.82 | 1.23 | 1.40 | 3.70 | 1.65 | 2.31 | 1.59 | 1.55 |
| DMA | 2.00 | 2.43 | 2.57 | 1.87 | 2.27 | 1.36 | 1.70 | 4.07 | 2.31 | 2.55 | 2.25 | 2.16 |
| DMSO | 2.18 | 2.57 | 1.85 | 1.87 | 2.33 | 1.16 | 1.55 | 2.37 | 1.90 | 1.44 | 1.76 | 1.69 |
| NMP | 1.55 | 1.87 | 1.87 | 1.01 | 1.18 | 0.80 | 0.83 | 2.23 | 1.07 | 1.34 | 1.01 | 0.98 |
| MG | 1.82 | 2.27 | 2.33 | 1.18 | 0.53 | 0.87 | 0.39 | 2.56 | 0.56 | 1.51 | 0.54 | 0.52 |
| GBL | 1.23 | 1.36 | 1.16 | 0.80 | 0.87 | | 0.51 | 0.59 | 0.42 | 0.31 | 0.34 | 0.35 |
| TEP | 1.40 | 1.70 | 1.55 | 0.83 | 0.39 | 0.51 | | 1.17 | | 0.66 | | |
| EC | 3.70 | 4.07 | 2.37 | 2.23 | 2.56 | 0.59 | 1.17 | 0.56 | | | | |
| DME | 1.65 | 2.31 | 1.90 | 1.07 | 0.56 | 0.42 | | 0.56 | | | | |
| PC | 2.31 | 2.55 | 1.44 | 1.34 | 1.51 | 0.31 | 0.66 | | | | | |
| MF | 1.59 | 2.25 | 1.76 | 1.01 | 0.54 | 0.34 | | | | | | |
| THF | 1.55 | 2.16 | 1.69 | 0.98 | 0.52 | 0.35 | | | | | | |
| SULF | 1.61 | 1.94 | 1.21 | 0.96 | 1.10 | | 0.48 | | | | | |
| DMC | 1.53 | 2.11 | 1.65 | 0.92 | 0.47 | | | | | | | |
| ACN | 1.54 | 2.04 | 1.61 | 1.19 | 1.57 | 0.31 | 0.72 | | 0.47 | | | |
| MA | 1.55 | 2.18 | 1.70 | 0.98 | 0.52 | 0.32 | | | | | | |
| DEC | 1.57 | 2.20 | 1.70 | 0.97 | 0.52 | 0.35 | | | | | | |
| DIOX | 1.56 | 2.18 | 1.69 | 0.99 | 0.55 | 0.39 | | | | | | |
| DEE | 1.62 | 2.31 | 1.77 | 0.98 | 0.51 | | | | | | | |
| EA | 1.51 | 2.09 | 1.63 | 0.94 | 0.50 | 0.32 | | | | | | |
| DMSU | 1.55 | 2.16 | 1.66 | 0.92 | 0.72 | | 0.32 | | 0.31 | | | |

| Solvent #1 | Solvent #2 | | | | | | | | |
|---|---|---|---|---|---|---|---|---|---|
| | SULF | DMC | ACN | MA | DEC | DIOX | DEE | EA | DMSU |
| DMF | 1.61 | 1.53 | 1.54 | 1.55 | 1.57 | 1.56 | 1.62 | 1.51 | 1.55 |
| DMA | 1.94 | 2.11 | 2.04 | 2.18 | 2.20 | 2.18 | 2.31 | 2.09 | 2.16 |
| DMSO | 1.21 | 1.65 | 1.61 | 1.70 | 1.70 | 1.69 | 1.77 | 1.63 | 1.66 |
| NMP | 0.96 | 0.92 | 1.19 | 0.98 | 0.97 | 0.99 | 0.98 | 0.94 | 0.92 |
| MG | 1.10 | 0.47 | 1.57 | 0.52 | 0.52 | 0.55 | 0.51 | 0.50 | |
| GBL | 0.31 | 0.32 | 0.35 | 0.39 | | 0.32 | | | |
| TEP | 0.48 | | 0.72 | | | | | | 0.32 |
| EC | | | | | | | | | |
| DME | | | 0.47 | | | | | | 0.31 |
| PC | | | | | | | | | |
| MF | | | | | | | | | |
| THF | | | | | | | | | |
| SULF | | | | | | | | | |
| DMC | | | | | | | | | |
| ACN | | | | | | | | | |
| MA | | | | | | | | | |
| DEC | | | | | | | | | |
| DIOX | | | | | | | | | |
| DEE | | | | | | | | | |
| EA | | | | | | | | | |
| DMSU | | | | | | | | | |

TABLE 2

Calculated Conductivity of Ternary Solvent Mixtures Containing EC

| Solvent #1 | Solvent #2 | | | | | | | | | | |
|---|---|---|---|---|---|---|---|---|---|---|---|
| | DMF | DMA | DMSO | NMP | MG | GBL | TEP | DME | PC | MF | THF |
| DMF | 4.63 | 5.03 | 4.05 | 4.04 | 4.59 | 2.91 | 3.52 | 3.78 | 2.57 | 3.62 | 3.57 |
| DMA | 5.03 | 5.60 | 4.39 | 4.28 | 4.93 | 2.90 | 3.68 | 4.16 | 2.52 | 3.97 | 3.89 |
| DMSO | 4.05 | 4.39 | 3.20 | 3.20 | 3.78 | 1.97 | 2.53 | 2.57 | 1.48 | 2.35 | 2.31 |
| NMP | 4.04 | 4.28 | 3.20 | 3.00 | 3.36 | 1.79 | 2.35 | 2.47 | 1.41 | 2.29 | 2.27 |
| MG | 4.59 | 4.93 | 3.78 | 3.36 | 3.60 | 1.90 | 2.64 | 2.87 | 1.54 | 2.68 | 2.67 |
| GBL | 2.91 | 2.90 | 1.97 | 1.79 | 1.90 | 0.72 | 1.12 | 0.81 | 0.40 | 0.66 | 0.68 |
| TEP | 3.52 | 3.68 | 2.53 | 2.35 | 2.64 | 1.12 | 1.62 | 1.46 | 0.71 | 1.26 | 1.26 |
| DME | 3.78 | 4.16 | 2.57 | 2.47 | 2.87 | 0.81 | 1.46 | 0.95 | | 0.62 | 0.63 |
| PC | 2.57 | 2.52 | 1.48 | 1.41 | 1.54 | 0.40 | 0.71 | | | | |
| MF | 3.62 | 3.97 | 2.35 | 2.29 | 2.68 | 0.66 | 1.26 | 0.62 | | | |
| THF | 3.57 | 3.89 | 2.31 | 2.27 | 2.67 | 0.68 | 1.26 | 0.63 | | 0.31 | |

TABLE 2-continued

Calculated Conductivity of Ternary Solvent Mixtures Containing EC

| | | | | | | | | | | |
|---|---|---|---|---|---|---|---|---|---|---|
| SULF | 3.02 | 3.08 | 1.80 | 1.66 | 1.81 | 0.45 | 0.83 | 0.36 | | |
| DMC | 3.50 | 3.79 | 2.25 | 2.16 | 2.48 | 0.61 | 1.17 | 0.57 | | |
| ACN | 3.46 | 3.76 | 2.23 | 2.21 | 2.59 | 0.63 | 1.21 | 0.53 | | |
| MA | 3.56 | 3.88 | 2.29 | 2.24 | 2.61 | 0.64 | 1.21 | 0.57 | | |
| DEC | 3.59 | 3.92 | 2.31 | 2.25 | 2.65 | 0.68 | 1.24 | 0.64 | 0.30 | 0.32 |
| DIOX | 3.60 | 3.94 | 2.32 | 2.32 | 2.80 | 0.73 | 1.30 | 0.67 | 0.30 | 0.31 |
| DEE | 3.63 | 3.97 | 2.32 | 2.21 | 2.54 | 0.60 | 1.17 | 0.56 | | |
| EA | 3.49 | 3.79 | 2.24 | 2.20 | 2.58 | 0.64 | 1.20 | 0.55 | | |
| DMSU | 3.51 | 3.80 | 2.22 | 2.13 | 2.44 | 0.58 | 1.12 | 0.51 | | |

| | Solvent #2 | | | | | | | | |
|---|---|---|---|---|---|---|---|---|---|
| Solvent #1 | SULF | DMC | ACN | MA | DEC | DIOX | DEE | EA | DMSU |
| DMF | 3.02 | 3.50 | 3.46 | 3.56 | 3.59 | 3.60 | 3.63 | 3.49 | 3.51 |
| DMA | 3.08 | 3.79 | 3.76 | 3.88 | 3.92 | 3.94 | 3.97 | 3.79 | 3.80 |
| DMSO | 1.80 | 2.25 | 2.23 | 2.29 | 2.31 | 2.32 | 2.32 | 2.24 | 2.22 |
| NMP | 1.66 | 2.16 | 2.21 | 2.24 | 2.25 | 2.32 | 2.21 | 2.20 | 2.13 |
| MG | 1.81 | 2.48 | 2.59 | 2.61 | 2.65 | 2.80 | 2.54 | 2.58 | 2.44 |
| GBL | 0.45 | 0.61 | 0.63 | 0.64 | 0.68 | 0.73 | 0.60 | 0.64 | 0.58 |
| TEP | 0.83 | 1.17 | 1.21 | 1.21 | 1.24 | 1.30 | 1.17 | 1.20 | 1.12 |
| DME | 0.36 | 0.57 | 0.53 | 0.57 | 0.64 | 0.67 | 0.56 | 0.55 | 0.51 |
| PC | | | | | | | | | |
| MF | | | | | 0.30 | 0.30 | | | |
| THF | | | | | 0.32 | 0.31 | | | |
| SULF | | | | | | | | | |
| DMC | | | | | | 0.30 | | | |
| ACN | | | | | | | | | |
| MA | | | | | | | | | |
| DEC | | | | | 0.32 | 0.32 | | | |
| DIOX | | 0.30 | | | 0.32 | 0.30 | | | |
| DEE | | | | | | | | | |
| EA | | | | | | | | | |
| DMSU | | | | | | | | | |

TABLE 3

Calculated Conductivity of Ternary Solvent Mixtures Containing PC

| | Solvent #2 | | | | | | | | | | |
|---|---|---|---|---|---|---|---|---|---|---|---|
| Solvent #1 | DMF | DMA | DMSO | NMP | MG | GBL | TEP | EC | DME | PC | MF | THF |
| DMF | | 2.90 | 3.16 | 2.53 | 2.52 | 2.87 | 1.80 | 2.19 | 2.57 | 2.36 | 2.26 | 2.23 |
| DMA | 3.16 | | 3.52 | 2.74 | 2.67 | 3.08 | 1.79 | 2.29 | 2.52 | 2.61 | 2.49 | 2.44 |
| DMSO | 2.53 | 2.74 | | 1.98 | 1.98 | 2.34 | 1.20 | 1.55 | 1.48 | 1.58 | 1.44 | 1.41 |
| NMP | 2.52 | 2.67 | 1.98 | | 1.84 | 2.06 | 1.08 | 1.43 | 1.41 | 1.50 | 1.39 | 1.37 |
| MG | 2.87 | 3.08 | 2.34 | 2.06 | | 2.19 | 1.13 | 1.59 | 1.54 | 4.73 | 1.61 | 1.61 |
| GBL | 1.80 | 1.79 | 1.20 | 1.08 | 1.13 | | 0.41 | 0.65 | 0.40 | 0.45 | 0.36 | 0.37 |
| TEP | 2.19 | 2.29 | 1.55 | 1.43 | 1.59 | 0.65 | | 0.96 | 0.72 | 0.85 | 0.72 | 0.72 |
| EC | 2.57 | 2.52 | 1.48 | 1.41 | 1.54 | 0.40 | 0.71 | | | | | |
| DME | 2.36 | 2.61 | 1.58 | 1.50 | 1.73 | 0.45 | 0.85 | | | 0.51 | | 0.31 |
| MF | 2.26 | 2.49 | 1.44 | 1.39 | 1.61 | 0.36 | 0.72 | | | | | |
| THF | 2.23 | 2.44 | 1.41 | 1.37 | 1.61 | 0.37 | 0.72 | | 0.31 | | | |
| SULF | 1.87 | 1.90 | 1.08 | 0.98 | 1.05 | | 0.46 | | | | | |
| DMC | 2.19 | 2.37 | 1.37 | 1.30 | 1.48 | 0.33 | 0.67 | | | | | |
| ACN | 2.16 | 2.35 | 1.37 | 1.34 | 1.56 | 0.35 | 0.70 | | | | | |
| MA | 2.22 | 2.43 | 1.40 | 1.35 | 1.57 | 0.35 | 0.70 | | | | | |
| DEC | 2.24 | 2.45 | 1.41 | 1.36 | 1.59 | 0.37 | 0.71 | | 0.31 | | | |
| DIOX | 2.25 | 2.47 | 1.42 | 1.40 | 1.69 | 0.41 | 0.75 | | 0.33 | | | |
| DEE | 2.27 | 2.48 | 1.41 | 1.33 | 1.51 | 0.32 | 0.66 | | | | | |
| EA | 2.18 | 2.37 | 1.37 | 1.33 | 1.55 | 0.35 | 0.69 | | | | | |
| DMSU | 2.19 | 2.38 | 1.35 | 1.28 | 1.45 | 0.31 | 0.63 | | | | | |

| | Solvent #2 | | | | | | | | |
|---|---|---|---|---|---|---|---|---|---|
| Solvent #1 | SULF | DMC | ACN | MA | DEC | DIOX | DEE | EA | DMSU |
| DMF | 1.87 | 2.19 | 2.16 | 2.22 | 2.24 | 2.25 | 2.27 | 2.18 | 2.19 |
| DMA | 1.90 | 2.37 | 2.35 | 2.43 | 2.45 | 2.47 | 2.48 | 2.37 | 2.38 |
| DMSO | 1.08 | 1.37 | 1.37 | 1.40 | 1.41 | 1.42 | 1.41 | 1.37 | 1.35 |

TABLE 3-continued

Calculated Conductivity of Ternary Solvent Mixtures Containing PC

| | | | | | | | | | |
|---|---|---|---|---|---|---|---|---|---|
| NMP | 0.98 | 1.30 | 1.34 | 1.35 | 1.36 | 1.40 | 1.33 | 1.33 | 1.28 |
| MG | 1.05 | 1.48 | 1.56 | 1.57 | 1.59 | 1.69 | 1.51 | 1.55 | 1.45 |
| GBL | | 0.33 | 0.35 | 0.35 | 0.37 | 0.41 | 0.32 | 0.35 | 0.31 |
| TEP | 0.46 | 0.67 | 0.70 | 0.70 | 0.71 | 0.75 | 0.66 | 0.69 | 0.63 |
| EC | | | | | | | | | |
| DME | | | | | 0.31 | 0.33 | | | |
| MF | | | | | | | | | |
| THF | | | | | | | | | |
| SULF | | | | | | | | | |
| DMC | | | | | | | | | |
| ACN | | | | | | | | | |
| MA | | | | | | | | | |
| DEC | | | | | | | | | |
| DIOX | | | | | | | | | |
| DEE | | | | | | | | | |
| EA | | | | | | | | | |
| DMSU | | | | | | | | | |

TABLE 4

Calculated Conductivity of Ternary Solvent Mixtures Containing DMC

| | Solvent #2 | | | | | | | | | | |
|---|---|---|---|---|---|---|---|---|---|---|---|
| Solvent #1 | DMF | DMA | DMSO | NMP | MG | GBL | TEP | EC | DME | PC | MF |
| DMF | 1.59 | 1.89 | 2.07 | 1.47 | 1.71 | 1.17 | 1.32 | 3.50 | 1.51 | 2.19 | 1.46 |
| DMA | 1.89 | 2.26 | 2.40 | 1.75 | 2.10 | 1.27 | 1.58 | 3.79 | 2.03 | 2.37 | 1.97 |
| DMSO | 2.07 | 2.40 | 1.74 | 1.77 | 2.18 | 1.10 | 1.46 | 2.25 | 1.70 | 1.37 | 1.57 |
| NMP | 1.47 | 1.75 | 1.77 | 0.97 | 1.13 | 0.78 | 0.79 | 2.16 | 0.97 | 1.30 | 0.91 |
| MG | 1.71 | 2.10 | 2.18 | 1.13 | 0.50 | 0.85 | 0.37 | 2.48 | 0.49 | 1.48 | 0.47 |
| GBL | 1.17 | 1.27 | 1.10 | 0.78 | 0.85 | | 0.50 | 0.61 | 0.41 | 0.33 | 0.33 |
| TEP | 1.32 | 1.58 | 1.46 | 0.79 | 0.37 | 0.50 | | 1.17 | | 0.67 | |
| EC | 3.50 | 3.79 | 2.25 | 2.16 | 2.48 | 0.61 | 1.17 | | 0.57 | | |
| DME | 1.51 | 2.03 | 1.70 | 0.97 | 0.49 | 0.41 | | 0.57 | | | |
| PC | 2.19 | 2.37 | 1.37 | 1.30 | 1.48 | 0.33 | 0.67 | | | | |
| MF | 1.46 | 1.97 | 1.57 | 0.91 | 0.47 | 0.33 | | | | | |
| THF | 1.43 | 1.90 | 1.52 | 0.89 | 0.46 | 0.34 | | | | | |
| SULF | 1.51 | 1.76 | 1.13 | 0.93 | 1.08 | | 0.49 | | | | |
| ACN | 1.42 | 1.80 | 1.45 | 1.07 | 1.37 | 0.30 | 0.65 | | 0.37 | | |
| MA | 1.43 | 1.91 | 1.52 | 0.88 | 0.45 | 0.31 | | | | | |
| DEC | 1.45 | 1.93 | 1.54 | 0.89 | 0.46 | 0.34 | | | | | |
| DIOX | 1.44 | 1.92 | 1.52 | 0.91 | 0.48 | 0.37 | | 0.30 | | | |
| DEE | 1.48 | 2.02 | 1.59 | 0.90 | 0.46 | | | | | | |
| EA | 1.40 | 1.84 | 1.47 | 0.86 | 0.44 | 0.31 | | | | | |
| DMSU | 1.42 | 1.90 | 1.49 | 0.85 | 0.64 | | | | | | |

| | Solvent #2 | | | | | | | | |
|---|---|---|---|---|---|---|---|---|---|
| Solvent #1 | THF | SULF | ACN | MA | DEC | DIOX | DEE | EA | DMSU |
| DMF | 1.43 | 1.51 | 1.42 | 1.43 | 1.45 | 1.44 | 1.48 | 1.40 | 1.42 |
| DMA | 1.90 | 1.76 | 1.80 | 1.91 | 1.93 | 1.92 | 2.02 | 1.84 | 1.90 |
| DMSO | 1.52 | 1.13 | 1.45 | 1.52 | 1.54 | 1.52 | 1.59 | 1.47 | 1.49 |
| NMP | 0.89 | 0.93 | 1.07 | 0.88 | 0.89 | 0.91 | 0.90 | 0.86 | 0.85 |
| MG | 0.46 | 1.08 | 1.37 | 0.45 | 0.46 | 0.48 | 0.46 | 0.44 | 0.64 |
| GBL | 0.34 | | 0.30 | 0.31 | 0.34 | 0.37 | | 0.31 | |
| TEP | | 0.49 | 0.65 | | | | | | |
| EC | | | | | | 0.30 | | | |
| DME | | | 0.37 | | | | | | |
| PC | | | | | | | | | |
| MF | | | | | | | | | |
| THF | | | | | | | | | |
| SULF | | | | | | | | | |
| ACN | | | | | | | | | |
| MA | | | | | | | | | |
| DEC | | | | | | | | | |

TABLE 4-continued

Calculated Conductivity of Ternary Solvent Mixtures Containing DMC

DIOX
DEE
EA
DMSU

TABLE 5

Calculated Conductivity of Ternary Solvent Mixtures Containing DME

| Solvent #1 | \multicolumn{11}{c}{Solvent #2} |
|---|---|---|---|---|---|---|---|---|---|---|---|

| Solvent #1 | DMF | DMA | DMSO | NMP | MG | GBL | TEP | EC | PC | MF | THF |
|---|---|---|---|---|---|---|---|---|---|---|---|
| DMF | 1.66 | 1.97 | 2.17 | 1.54 | 1.80 | 1.25 | 1.40 | 3.78 | 2.36 | 1.57 | 1.54 |
| DMA | 1.97 | 2.37 | 2.54 | 1.86 | 2.23 | 1.38 | 1.70 | 4.16 | 2.61 | 2.15 | 2.08 |
| DMSO | 2.17 | 2.54 | 1.88 | 1.90 | 2.34 | 1.22 | 1.61 | 2.57 | 1.58 | 1.80 | 1.74 |
| NMP | 1.54 | 1.86 | 1.90 | 1.04 | 1.22 | 0.87 | 0.88 | 2.47 | 1.50 | 1.05 | 1.02 |
| MG | 1.80 | 2.23 | 2.34 | 1.22 | 0.55 | 0.96 | 0.41 | 2.87 | 1.73 | 0.55 | 0.53 |
| GBL | 1.25 | 1.38 | 1.22 | 0.87 | 0.96 | 0.36 | 0.59 | 0.81 | 0.45 | 0.45 | 0.45 |
| TEP | 1.40 | 1.70 | 1.61 | 0.88 | 0.41 | 0.59 | | 1.46 | 0.85 | | |
| EC | 3.78 | 4.16 | 2.57 | 2.47 | 2.87 | 0.81 | 1.46 | 0.35 | | 0.62 | 0.63 |
| PC | 2.36 | 2.61 | 1.58 | 1.50 | 1.73 | 0.45 | 0.85 | | | | 0.31 |
| MF | 1.57 | 2.15 | 1.80 | 1.05 | 0.55 | 0.45 | | 0.62 | | | |
| THF | 1.54 | 2.08 | 1.74 | 1.02 | 0.53 | 0.45 | | 0.63 | 0.31 | | |
| SULF | 1.63 | 1.94 | 1.30 | 1.09 | 1.28 | 0.32 | 0.64 | 0.36 | | 0.31 | 0.32 |
| DMC | 1.51 | 2.03 | 1.70 | 0.97 | 0.49 | 0.41 | | 0.57 | | | |
| ACN | 1.53 | 1.97 | 1.65 | 1.23 | 1.58 | 0.41 | 0.81 | 0.53 | | 0.40 | 0.40 |
| MA | 1.54 | 2.09 | 1.74 | 1.01 | 0.53 | 0.43 | | 0.57 | | | |
| DEC | 1.56 | 2.12 | 1.76 | 1.02 | 0.54 | 0.46 | | 0.64 | 0.31 | | |
| DIOX | 1.55 | 2.10 | 1.74 | 1.03 | 0.56 | 0.49 | | 0.67 | 0.33 | | |
| DEE | 1.60 | 2.21 | 1.82 | 1.03 | 0.54 | 0.42 | | 0.56 | | | |
| EA | 1.50 | 2.02 | 1.68 | 0.98 | 0.S1 | 0.42 | | 0.55 | | | |
| DMSU | 1.53 | 2.08 | 1.71 | 0.97 | 0.76 | 0.39 | 0.38 | 0.51 | | | |

| Solvent #1 | SULF | DMC | CAN | MA | DEC | DIOX | DEE | EA | DMSU |
|---|---|---|---|---|---|---|---|---|---|
| DMF | 1.63 | 1.51 | 1.53 | 1.54 | 1.56 | 1.55 | 1.60 | 1.50 | 1.53 |
| DMA | 1.94 | 2.03 | 1.97 | 2.09 | 2.12 | 2.10 | 2.21 | 2.02 | 2.08 |
| DMSO | 1.30 | 1.70 | 1.65 | 1.74 | 1.76 | 1.74 | 1.82 | 1.68 | 1.71 |
| NMP | 1.09 | 0.97 | 1.23 | 1.01 | 1.02 | 1.03 | 1.03 | 0.98 | 0.97 |
| MG | 1.28 | 0.49 | 1.58 | 0.53 | 0.54 | 0.56 | 0.54 | 0.51 | 0.76 |
| GBL | 0.32 | 0.41 | 0.41 | 0.43 | 0.46 | 0.49 | 0.42 | 0.42 | 0.39 |
| TEP | 0.64 | | 0.81 | | | | | | 0.38 |
| EC | 0.36 | 0.57 | 0.53 | 0.57 | 0.64 | 0.67 | 0.56 | 0.55 | 0.51 |
| PC | | | | | 0.31 | 0.33 | | | |
| MF | 0.31 | | 0.40 | | | | | | |
| THF | 0.32 | | 0.40 | | | | | | |
| SULF | | | | | 0.33 | 0.35 | | | |
| DMC | | | 0.37 | | | | | | |
| ACN | | 0.37 | | 0.36 | 0.45 | 0.44 | 0.43 | 0.32 | 0.34 |
| MA | | | 0.36 | | | | | | |
| DEC | 0.33 | | 0.45 | | | | | | |
| DIOX | 0.35 | | 0.44 | | | | | | |
| DEE | | | 0.43 | | | | | | |
| EA | | | 0.32 | | | | | | |
| DMSU | | | 0.34 | | | | | | |

The process of the invention comprises at least a first solvent contacting step comprising exposing the dried FLIEPM to a first solvent or mixture of solvents. If the embodiment of the process of the invention comprises only the first solvent contacting step, the first solvent or mixture of solvents must be of the invention, as herein disclosed. If the embodiment of the process of the invention comprises second or subsequent solvent contacting steps, the first solvent or mixture of solvents may or may not be a solvent or mixture of solvents of the invention.

In one embodiment of the process of the invention, in a first solvent contacting step a solvent of the invention is employed, and in a second solvent contacting step an aprotic solvent which may or may not be itself of the invention is employed thereby forming a solvent mixture in the membrane.

In a preferred embodiment of the process of the invention, a solvent of the invention is employed in a first solvent contacting step followed by a second solvent contacting step, wherein is employed a second solvent, the first solvent being more effective at swelling the ionomer than the second. It has been found in the practice of the present invention that a higher uptake of the second solvent, and higher conductivity, is achieved than would have been attained the first and second solvents simply combined in a single solvent contacting step.

In an alternative embodiment of the process of the invention, a mixture of aprotic solvents is made, at least one of which is of the invention, and the membrane is exposed thereto in a single solvent contacting step.

In a further embodiment of the invention, a protic solvent such as methanol, is employed in a first solvent contacting step of the process of the invention, in order to cause the lithium ionomer to swell, methanol being a particularly effective swelling agent for the lithium ionomer. Upon exposure of the methanol-swollen ionomer to a second, aprotic solvent in a second solvent contacting step of the process of the invention, it has been found that a higher uptake of the second solvent, and higher conductivity, is achieved than would have been attained had the first solvent contacting step been omitted. This embodiment is less preferred because it is believed that some residue of the first solvent remains after the second or subsequent solvent contacting steps, with possible deleterious effects upon the lifetime and performance of a lithium battery formed from the membrane so-produced.

It is often desirable to employ a mixture of solvents because each solvent provides a benefit. For example, one solvent may afford higher stability under conditions of use in a battery, while another affords higher ionic conductivity. By combining the two, the resultant polymer electrolyte membrane exhibits higher stability than the one solvent would provide and higher conductivity than the other solvent would provide. In some cases, known in the art, the resultant properties are better than a simple rule of mixtures predicts.

There are also aprotic solvents and mixtures of aprotic solvents which are of the invention when they are employed in the second or subsequent solvent contacting steps in the process of the invention, after a first swelling step employing a solvent which is not of the invention but which causes extensive swelling of the polymer. Only by inclusion of the first swelling step preceding the second or subsequent swelling step is the conductivity of the resultant polymer electrolyte membrane greater than $10^{-4}$ S/cm.

Numerous solvents and combinations of solvents are suitable for use in the practice of this invention. As hereinabove shown, the amount of solvent uptake is a key factor, though not the only factor, in determining the conductivity of the membrane produced by the process of this invention. With some solvents, the membrane may simply be contacted with solvent for about 24 hours, or less, at room temperature to achieve a high equilibrium solvent uptake and produce a FLIEPEM of this invention. With other solvents, soaking in an excess of solvent, for as long as two weeks or more, may be required to achieve equilibrium uptake. In certain cases, it has been found that soaking at elevated temperatures of ca. 60–90° C. is beneficial in reducing the necessary soaking time.

The specific means of solvent contacting will similarly depend upon the particular solvents and membranes employed. In some cases, the objects of the invention can be achieved only when the membrane is soaked in an excess of solvent for period of time extending to days or weeks, or at elevated temperatures. However, in other cases, the membrane is exposed to an amount of solvent which the membrane imbibes completely and rapidly, leaving no excess from which the membrane must be separated.

Solvents and solvent mixtures suitable for the practice of the present invention include those selected from the group consisting of dimethyl formamide (DMF), dimethoxyethane (DME), ethylene carbonate (EC), propylene carbonate (PC), dimethyl sulfoxide (DMSO), gamma-butyrolactone (GBL), N,N'-dimethylpropyleneurea (DMPU), 1-methyl-2-pyrrolidone (NMP), dimethyl acetamide (DMA), N,N'-dimethyl butyramide (DMB), triethylphosphate (TEP), n,n'-di-n-butylacetamide (DBA), and mixtures thereof; or a mixture of PC with a solvent selected from the group consisting of DME, EC, GBL, dimethyl carbonate (DMC), and acrylonitrile (ACN); or a mixture of EC with a solvent selected from the group consisting of DME, GBL, DMSO, diethoxyethane (DEE), and DMC; or a mixture of NMP with a solvent selected from the group consisting of DME, DMSO, GBL, DMF, and DMA; or a mixture of GBL with DEE or DME; or a mixture of EC and DME with a solvent selected from the group consisting of diethyl carbonate (DEC), DMC, and PC; or a mixture of DMF and a solvent selected from the group consisting of DMA, DMSO, NMP, methyl glycolate (MG), GBL, TEP, EC, DME, PC, methyl formate (MF), tetrahydrofuran (THF), sulfolane (SULF), DMC, ACN, methyl acetate (MA), DEC, 1,3-dioxolane (DIOX), DEE, ethyl acrylate (EA), and dimethyl sulfite (DMSU); or a mixture of DMA and a solvent selected from the group consisting of DMSO, NMP, MG, GBL, TEP, EC, DME, PC, MF, THF, SULF, DMC, ACN, MA, DEC, DIOX, DEE, EA, and DMSU; or a mixture of DMSO and a solvent selected from the group consisting of NMP, MG, GBL, TEP, EC, DME, PC, MF, THF, SULF, DMC, ACN, MA, DEC, DIOX, DEE, EA, and DMSU; or a mixture of NMP and a solvent selected from the group consisting of MG, GBL, TEP, EC, DME, PC, MF, THF, SULF, DMC, ACN, MA, DEC, DIOX, DEE, EA, and DMSU; or a mixture of MG and a solvent selected from the group consisting of GBL, TEP, EC, DME, PC, MF, THF, SULF, DMC, ACN, MA, DEC, DIOX, DEE, EA, and DMSU; or a mixture of GBL and a solvent selected from the group consisting of TEP, EC, DME, PC, MF, THF, ACN, MA, DEC, DIOX, and EA; or a mixture of TEP and a solvent selected from the group consisting of EC, PC, SULF, ACN, and DMSU; or a mixture of EC and DME; or a mixture of DME and either ACN or DMSU or a mixture of EC, DMF and a solvent selected from the group consisting of DMA, DMSO, NMP, MG, GBL, TEP, DME, PC, MF, THF, SULF, DMC, ACN, MA, DEC, DIOX, DEE, EA, and DMSU; or a mixture of EC, DMA and a solvent selected from the group consisting of DMSO, NMP, MG, GBL, TEP, DME, PC, MF, THF, SULF, DMC, ACN, MA, DEC, DIOX, DEE, EA, and DMSU; or a mixture of EC, DMSO and a solvent selected from the group consisting of NMP, MG, GBL, TEP, DME, PC, MF, THF, SULF, DMC, ACN, MA, DEC, DIOX, DEE, EA, DMSU; or a mixture of EC, NMP and a solvent selected from the group consisting of MG, GBL, TEP, DME, PC, MF, THF, SULF, DMC, ACN, MA, DEC, DIOX, DEE, EA, and DMSU; or a mixture of EC, MG and a solvent selected from the group consisting of GBL, TEP, DME, PC, ME, THF, SULF, DMC, ACN, MA, DEC, DIOX, DEE, EA, and DMSU; or a mixture of EC, GBL, and a solvent selected from the group consisting of TEP, DME, PC, MF, THF, SULF, DMC, ACN, MA, DEC, DIOX, DEE, EA, and DMSU; or a mixture of EC, TEP and a solvent selected from the group consisting of DME, PC, MF, THF, SULF, DMC, ACN, MA, DEC, DIOX, DEE, EA, and DMSU; or a mixture of EC, DME and a solvent selected from the group consisting of MF, THF, SULF, DMC, ACN, MA, DEC, DIOX, DEE, EA, and DMSU; or a mixture of EC, MF and either DEC or DIOX; or a mixture of EC, THF and either DEC or DIOX; a mixture of EC, DMC and DIOX; or a mixture of EC, DEC and DIOX; or a mixture of PC, DMF and a solvent selected from the group consisting of DMA, DMSO, NMP, MG, GBL, TEP, EC, DME, MF, THF, SULF, DMC, ACN, MA, DEC, DIOX, DEE, EA, and DMSU; or a mixture of PC, DMA and a solvent selected from the group consisting of DMSO, NMP, MG, GBL, TEP, EC, DME, MF, THF, SULF, DMC, ACN, MA, DEC, DIOX, DEE, EA, and DMSU; or a mixture of PC, DMSO and a solvent selected from the group consisting of NMP, MG, GBL, TIEP, EC, DME, MF, THF, SULF, DMC, ACN, MA, DEC, DIOX, DEE, EA, and DMSU; or a mixture of PC, NMP and a solvent selected from the group consisting of MG, GBL, TEP, EC, DME, MF, THF, SULF, DMC, ACN, MA, DEC, DIOX, DEE, EA, and DMSU; or a mixture of PC, MG and a solvent selected from the group consisting of GBL, TEP, EC, DME, MF, THF, SULF, DMC, ACN, MA, DEC, DIOX, DEE, EA, and DMSU; or a mixture of PC, GBL and a solvent selected from the group consisting of TEP, EC, DME, MF, THE, DMC, ACN, MA, DEC, DIOX, DEE, EA, and DMSU; or a mixture of PC, TEP and a solvent selected from the group consisting of EC, DME, MF, THF, SULF, DMC, ACN, MA, DEC, DIOX, DEE, EA, and DMSU; or a mixture of PC, DME and a solvent selected from the group consisting of THF, DEC, and DIOX; or a mixture of DMC, DMA and a solvent selected from the group consisting of DMSO, NMP, MG, GBL, TEP, EC, DME, PC, ME, THE, SULF, ACN, MA, DEC, DIOX, DEE, EA, and DMSU; or a mixture of DMC, DMSO and a solvent selected from the group consisting of NMP, MG, GBL, TEP, EC, DME, PC, MF, THF, SULF, ACN, MA, DEC, DIOX, DEE, EA, and DMSU; or a mixture of DMC, NMP and a solvent selected from the group consisting of MG, GBL, TEP, EC, DME, PC, MF, THF, SULF, ACN, MA, DEC, DIOX, DEE, EA, and DMSU; or a mixture of DMC, MG and a solvent selected from the group consisting of GBL, TEP, EC, DME, PC, MF, THF, SULF, ACN, MA, DEC, DIOX, DEE, EA, and DMSU; or a mixture of DMC, GBL and a solvent selected from the group consisting of TEP, EC, DME, PC, MF, THF, ACN, MA, DEC, DIOX, and EA; or a mixture of DMC, TEP and a solvent selected from the group consisting of EC, PC, SULF, and ACN; or a mixture of DMC, EC and either DME or DIOX; or a mixture of DMC, DME and ACN or a mixture of DME, DMF and a solvent selected from the group consisting of DMA, DMSO, NMP, MG, GBL, TEP, EC, PC, MF, THF, SULF, DMC, ACN, MA, DEC, DIOX, DEE, EA, and DMSU; or a mixture of DME, DMA and a solvent selected from the group consisting of DMSO, NMP, MG, GBL, TEP, EC, PC, MF, THF, SULF, DMC, ACN, MA, DEC, DIOX, DEE, EA, and DMSU; or a mixture of DME, DMSO and a solvent selected from the group consisting of NMP, MG, GBL, TEP, EC, PC, MF, THF, SULF, DMC, ACN, MA, DEC, DIOX, DEE, EA, and DMSU; or a mixture of DME, NMP and a solvent selected from the group consisting of MG, GBL, TEP, EC, PC, MF, THF, SULF, DMC, ACN, MA, DEC, DIOX, DEE, EA, and DMSU; or a mixture of DME, MG and a solvent selected from the group consisting of GBL, TEP, EC, PC, MF, THF, SULF, DMC, ACN, MA, DEC, DIOX, DEE, EA, and DMSU; or a mixture of DME, GBL and a solvent selected from the group consisting of TEP, EC, PC, MF, THF, SULF, DMC, ACN, MA, DEC, DIOX, DEE, EA, and DMSU; or a mixture of DME, TEP and a solvent selected from the group consisting of EC, PC, SULF, ACN, and DMSU; or a mixture of DME, EC and a solvent selected from the group consisting of MF, THF, SULF, DMC, ACN, MA, DEC, DIOX, DEE, EA, and DMSU; or a mixture of DME, PC and a solvent selected from the group consisting of THF, DEC, and DIOX; or a mixture of DME, MF and either SULF or ACN; or a mixture of DME, THF and either SULF or ACN; or a mixture of DME, SULF and either DEC or DIOX; or a mixture of DME, DMC and ACN; or a mixture of DME, ACN and a solvent selected from the group consisting of MA, DEC, DIOX, DEE, EA, and DMSU.

Solvents and solvent mixtures preferred for the practice of the present invention include the group consisting of DMF, DME, EC, PC, DMSO, GBL, DMPU, NMP, DMA, DMB, TEP, DBA, and mixtures thereof; or a mixture of PC with a solvent selected from the group consisting of DME, EC, GBL, DMC, and ACN; or a mixture of EC with a solvent selected from the group consisting of DME, GBL, DMSO, DEE, and DMC; or a mixture of NMP with a solvent selected from the group consisting of DME, DMSO, GBL, DMF, and DMA; or a mixture of GBL with DEE or DME; or a mixture of EC and l)ME with a solvent selected from the group consisting of DEC, DMC, and PC.

More preferred solvents include DMSO, DMF, PC, EC, NMP, GBL, and mixtures thereof, and mixtures thereof with at least one solvent selected from the group consisting of DMC, DME, and DEC.

Most preferred for the practice of the invention are a mixture of EC and DMC, and mixtures thereof with at least one additional solvent selected from the group consisting of GBL, PC, DEC, DMSO, and DME.

Not all solvents suitable for use in the present invention are equally well-suited to all possible lithium battery configurations. For practical utility in a lithium battery, the electrolyte must not only be conductive, but must also exhibit stability to the electrochemical environment within which it will be operating. The electrochemical operating environment is determined largely by the choice of electrode materials. As described in Tarascon et al., "New electrolyte membrane compositions stable over the 0 to 5 V voltage range and compatible with the Li1+xMn2O4/carbon Li-ion cells", Solid St. Ionics, 69, 293 (1994), the stability of a particular solvent against a particular electrode depends on the kinetics of the solvent breakdown process which cannot be predicted by theory. Thus, the suitability for use of any particular solvent choice in a particular lithium battery configuration needs to be determined on a case by case basis by testing the electrolyte in the proposed operating environment. Many of the solvents employed in the specific embodiments hereinbelow described are solvents known in the art to exhibit good stability in a wide range of lithium battery operating environments.

The FLIEPEM of this invention need not have any particular shape, and may be formed into any geometry desired by known means. However, the form of a flat membrane film is preferred. Thicker films require a longer time to achieve the desired level of conductivity. Thickness of 5 to 200 micrometers is preferred, with films of 50 or fewer micrometers in thickness most preferred.

The form of a flat film may conveniently be achieved by extrusion melt casting the unhydrolyzed form of the membrane followed by the hydrolysis treatment hereinabove described.

Alternatively, a flat lithium ionomer membrane may be produced by solution casting. In one embodiment of this method, the unhydrolyzed polymer is first hydrolyzed to the potassium ionomer, then ion-exchanged to form the acid, which is then dissolved at elevated temperatures in a mixture of alcohol such as methanol, ethanol, propanol or butanol, with propanol preferred, with water. Such liquid dispersions of perfluorinated ion exchange resins are disclosed in U.S. Pat. No. 4,453,991. In the solution or dispersion form, the acid polymer is then ion-exchanged with LiOH to give the lithium ionomer. In order to increase the strength of the membranes to be cast, the water and propanol of the solution may be replaced, using rotary evaporation, with a higher boiling liquid such as 1-butanol. The solids content of the dispersion is increased either by driving off some solvent or the addition of other materials in order to increase the viscosity of the dispersion or solution. The resultant paste is deposited using a doctor blade onto a substrate such as Teflon® PFCA, available from DuPont. The thus deposited membrane is then dried and removed. Other techniques of solution and dispersion coating, known in the art, are equally effective.

In another embodiment of the solution/dispersion process of the invention the FLIEPM is in dispersion in a low-boiling alcohol such as methanol. High-boiling solvents such as a mixture of EC and PC are added to the dispersion. The resulting dispersion is cast onto a substrate. The methanol preferenially evaporates, leaving the film already imbibed with desired solvents. The resulting film is then heated to coalesce. No additional step of soaking in a solvent is required.

This invention still further provides for a porous electrode comprising particles of an electrode-active material, a highly fluorinated lithium ion exchange polymer of the invention and at least one aprotic solvent of the invention. Examples of useful electrode-active materials include, but are not limited to, carbon (graphitic or coke-type), lithium metal nitrides such as $Li_{2.6}Co_{0.4}N$, tin oxides, transition metal oxides such as $LiMn_2O_4$, $LiCoO_2$, $LiNiO_2$, and organosulfur compounds. Preferably, the volume fraction of the lithium ionomer in the finished electrode is between 4 and 40%.

In one embodiment of the process for forming an electrode, a coating paste is formed with a dispersion or solution of the highly fluorinated lithium ion exchange polymer of the invention in a polar, protic solvent such as water, alcohol, or mixtures of water and alcohol, preferably a mixture of an aprotic solvent, most preferably propylene carbonate, and an alcohol, to which dispersion has been added an electrode-active material, preferably in the form of a powder, to which dispersion preferably optional plasticizer, and optional electron-conductive particles have also been added. A film from the coating paste is deposited on a substrate, and the solvent evaporated. The film is then coalesced with the application of heat and/or pressure, preferably in the temperature range of 180–200° C. The resulting electrode is then in form suitable for laminating to a FLIEPM. The coalesced electrode film is then imbibed with at least one aprotic solvent of the invention to form the electrode of the invention. Any method known in the art for depositing films onto a substrate from paste may be employed. Among the methods known are doctor-blade coating, reverse-roll coating, slot-die coating, and extrusion.

In another embodiment of the process for forming an electrode of the invention, a coating paste is formed with a dispersion or solution of a highly fluorinated polymer having pendant sulfonyl fluoride groups in a perfluorocarbon solvent such as FC40, available from 3M Company, Minneapolis Minn., optional plasticizer, optional electron-conductive particles, and electrode-active material; forming a film from the coating paste using means known in the art as hereinabove described; evaporating the solvent; and, hydrolyzing the sulfonylfluoride-form polymer to lithium-form using e.g., LiOH.

In a preferred embodiment, a battery is formed by a process comprising laminating the electrodes hereinabove described with an FLIEPEM by the application of pressure at a temperature of ca. 180° C., at which temperature the electrode layers can simultaneously be coalesced and the battery formed.

The present invention is further described in the following specific embodiments.

EXAMPLES

In the following specific embodiments and comparative examples, conductivity was determined using the four-point probe technique hereinabove described. % weight uptake of solvent (W %) was determined using a model PM400 (Mettler Instrument Corporation, Hightstown N.J.) laboratory balance with a precision of 0.001 gram as follows: Membrane dry weight ($W_d$) was determined. Membrane "wet" weight ($W_w$) after exposure to solvent was measured after first removing membrane from solvent and then blotting it dry using a paper towel to remove excess surface solvent. All weights were determined in a dry box with a nitrogen flush. The weight uptake of solvent was defined as:

$$W\% = 100 \cdot (W_w - W_d)/(W_d)$$

Comparative Example 1

A 980 g/equivalent copolymer of TFE and perfluoro(3,6-dioxa-4-methyl-7-octenesulfonyl fluoride) melt cast film 127 μm in thickness was hydrolyzed to the potassium ionomer by soaking in a bath consisting of 16% KOH, 20% DMSO, and 64% $H_2O$ at 80° C. for 2–4 hours followed by a water rinse. The thus produced potassium ionomer was then converted to the acid form by treatment in 5% aqueous nitric acid for ca. 48 hours at room temperature. The acid polymer was then converted into the lithium ionomer by treatment at 85° C. for ca. 35 minutes in an excess of a 6.2 M solution of LiOH in a mixture of $H_2O$ and MeOH containing 68% water by volume, followed by cooling overnight and drying in a vacuum oven at 110° C. for ca. 64 hours.

A 1.1 cm×2 cm specimen was immersed in propylene carbonate occupying ca. ⅓ the volume of a ca. 10 cm diameter×1.25 cm deep Petri dish and covered. The specimen was soaked for 48 hours at a room temperature of ca. 22° C., then removed from the solvent. Surface solvent was removed by tapping, then the specific conductivity was measured using the four-point probe technique hereinabove described and found to be $3.4 \times 10^{-5}$ S/cm.

Comparative Example 2

The materials and procedures were the same as in Comparative Example 1 except that the solvent was dimethoxyethane. The membrane was soaked for 3.7 hours. Conductivity was $1.7 \times 10^{-5}$ S/cm.

Example 1

The materials and procedures were the same as in Comparative Example 1 except that the solvent was a 50/50 by volume mixture of propylene carbonate and dimethoxyethane. The membrane was soaked for 48 hours. Specific conductivity was $3.5 \times 10^{-4}$ S/cm. Weight uptake of solvent was 57%.

Comparative Example 3

The procedures of Comparative Example 1 were repeated except that the membrane was a 1268 g/equivalent membrane of 178 mm thickness. The membrane was soaked for 48 hours. Conductivity was $5.6 \times 10^{-6}$ S/cm.

Comparative Example 4

The materials and procedures of Comparative Example 3 were repeated except that the solvent was dimethoxyethane. The membrane was soaked for 3.8 hours. Specific conductivity was $2.2 \times 10^{-5}$ S/cm.

Comparative Example 5

The materials and procedures of Comparative Example 3 were repeated except that the solvent was a 50/50 by volume mixture of propylene carbonate and dimethoxyethane. The membrane was soaked for 48 hours. Specific conductivity was $7.5 \times 10^{-5}$ S/cm.

Example 2 and Comparative Example 6

Employing the materials and procedures of Comparative Example 1, a membrane specimen was soaked for 45.3 hours at room temperature in propylene carbonate. The soaking specimen was then heated to 60° C. and held for ca. 1.5 hours. It was further heated to 90° C. and held for 30 minutes more, followed by gradual cooling to room temperature on the bench.

A second specimen was soaked at room temperature in glycerin carbonate for 44.8 hours. The soaking specimen was then heated to 60° C. and held for ca. 1.5 hours. It was further heated to 90° C. and held for 30 minutes more, followed by gradual cooling to room temperature on the bench. Results are as shown in Tables 6 and 7:

TABLE 6

Propylene Carbonate, Example 2

| Time (hours) | Temperature (° C.) | Specific Conducitivity (S/cm) | % Weight Uptake |
|---|---|---|---|
| 45.3 | 23 | $7.3 \times 10^{-6}$ | 39 |
| 48.8 | 60 | $6.2 \times 10^{-5}$ | 73 |
| 69.7 | 90 | $3.0 \times 10^{-4}$ | 132 |

TABLE 7

Glycerine Carbonate, Comparative Example 6

| Time (hours) | Temperature (° C.) | Specific Conducitivity (S/cm) |
|---|---|---|
| 44.8 | 23 | $3.6 \times 10^{-6}$ |
| 48.2 | 60 | $3.4 \times 10^{-6}$ |
| 70.4 | 90 | $9.2 \times 10^{-6}$ |

Examples 3–35 and Comparative Example 7 and 8

In these examples, 3"×3" specimens of Nafion® 117, a ca. 1100 g/eq. acid-hydrolyzed flat membrane ca. 180 μm in thickness formed from a melt cast copolymer of TFE and perfluoro(3,6-dioxa-4-methyl-7-octenesulfonyl fluoride), available from DuPont were converted to the lithium ionomer by exposure to an excess of LiOH-1 (98%, EM Science, Gibbstown, N.J.), 1.0 molar in 1:1 by volume mixture of water and DMSO (HPLC gradeBurdick & Jackson, Muskegon, Mich.) mixture at T=60° C. for 2 hours, after which the membrane was washed in distilled water for 2 hours at T=80° C., and dried in a recirculating nitrogen oven (Electric Hlotpack Company, Inc., Model 633, Philadelphia, Pa.) at 100° C. for 96 hours.

The dried membrane was transferred to a sealed container while still warm and conveyed to a glove box having a positive pressure of dry nitrogen applied thereto, wherein the membrane was removed from the sealed container and allowed to come to room temperature. The membrane was then cut into several sections 1.0 cm by 1.5 cm in size for the purpose of soaking in the solvents indicated hereinbelow.

Comparative Example 7

The membrane sample was soaked in an excess of N-methyl formamide (99.8%, Alfa Aesar, Ward Hill, Mass.), a protic solvent, in a sealed glass vial for 2 hours at room temperature. The membrane was removed from the n-methyl formamide bath, blotted with a paper towel to remove excess solvent, and tested using the four point probe test described above. Solvent uptake was determined by the method described above. Solvent uptake was 137.5%. Conductivity was $4.60 \times 10^{-3}$ S/cm.

Comparative Example 8

The membrane from Comparative Example 7 while still in the solvent was then heated to 60° C. using a hot plate (PMC 730 Series, Dataplate Digital Hot Plate) and held for 120 minutes, whereupon the solvent bath containing the membrane was removed from the hot plate and allowed to cool for ca. 2 hours. The membrane was removed from the N-methyl formamide bath, blotted with a paper towel to remove excess solvent, and tested using the four point probe test described above. Solvent uptake was determined by the method described above. Solvent uptake was 283.9%. Conductivity was $4.66 \times 10^{-3}$ S/cm.

Example 3

The membrane was treated according to the method of Comparative Example 7 except that the solvent was dimethyl formamide (ACS grade, 99.8%, Alfa Aesar, Ward Hill, Mass.). The solvent uptake was 125.5% and the conductivity was $3.47 \times 10^{-3}$ S/cm.

Example 4

The membrane was treated according to the method of Comparative Example 7 except that the solvent was dimethoxyethane (98%, Aldrich Chemical Co., Inc., Milwaukee, Wis.). The solvent uptake was 25.9% and the conductivity was $2.24 \times 10^{-4}$ S/cm.

Example 5

The membrane was treated according to the method of Comparative Example 7 except that the solvent was a 1:1 by volume mixture of propylene carbonate (99) and dimethoxyethane and the membrane was left in the solvent for 5 hours at room temperature. The solvent uptake was 56.5% and the conductivity was $2.57 \times 10^{-4}$ S/cm.

Example 6

The membrane was treated according to the method of Comparative Example 7 except that the solvent was a 1:1 by volume mixture of propylene carbonate and ethylene carbonate (98%, Aldrich Chemical Co., Inc., Milwaukee, Wis.) and the membrane sample was left in the solvents at room temperature for a period of 7 days. After this period, a heat treatment was carried out according to the method described in Comparative Example 8. The solvent uptake was 85.5% and the conductivity was $1.34 \times 10^{-4}$ S/cm.

Example 7

The membrane was treated according to the method of Comparative Example 7 except that the solvent was dimethyl sulfoxide (ACS grade, 99.9+%, Alfa Aesar, Ward Hill, Mass.) and the membrane was left in the solvent for 24 hours at room temperature. The solvent uptake was 135.6% and the conductivity was $1.52 \times 10^{-3}$ S/cm.

Example 8

The membrane was treated according to the method of Comparative Example 7 except that the solvent was gamma-butyrolactone (99) and the membrane was left in the solvent for 24 hours at room temperature. The solvent uptake was 88.3% and the conductivity was $4.75 \times 10^{-4}$ S/cm.

Example 9

The membrane was treated according to the method of Comparative Example 7 except that the solvent was N,N'-dimethylpropyleneurea (98%, Aldrich Chemical Co., Inc., Milwaukee, Wis.) and the membrane was left in the solvent for 24 hours at room temperature. The solvent uptake was 230.4% and the conductivity was $5.77 \times 10^{-4}$ S/cm.

Example 10

The membrane was treated according to the method of Comparative Example 7, after which to the original N-methyl formamide solvent was added an equal quantity of propylene carbonate (ACS grade, 99.8+%, Alfa Aesar, Ward Hill, Mass.). After 24 hours at room temperature, the solvent uptake was 278.6% and the conductivity was $3.44 \times 10^{-3}$ S/cm.

Example 11

The membrane was treated according to the method of Comparative Example 7 except that the solvent was a 1:1 by volume mixture of ethylene carbonate and diethyl carbonate (99%, Aldrich Chemical Co., Inc., Milwaukee, Wis.). After a 12 day period, a quantity of dimethoxyethane was added to bring the total solution composition to 1: 1:1 by volume of the three solvents. After a 24 hour period at room temperature the solvent uptake was 39.0% and the conductivity was $1.39 \times 10^{-4}$ S/cm.

Example 12

A 1.0 cm by 1.5 cm membrane sample prepared in the manner of Example 11 was treated according to the method therein described, except that the initial solvent was a 1:1 by volume mixture of ethylene carbonate and propylene carbonate. The solvent uptake was 69.1% and the conductivity was $3.12 \times 10^{-4}$ S/cm.

Example 13

The membrane was treated according to the method of Example 11 except that the initial solvent was dimethoxyethane, and to this was added a 1:1 mixture of dimethyl carbonate (99%, Alfa Aesar, Ward Hill, Mass.) and propylene carbonate after 32 days in order to bring the final composition to 1:1:1 by volume. After a 24 hour period, the membrane was heated according to the procedure described in Comparative Example 8. The solvent uptake was 46.6% and the conductivity was $1.12 \times 10^{-4}$ S/cm.

Example 14

The membrane was treated according to the method of Comparative Example 7 except that the solvent was 1-methyl-2-pyrrolidone (99.5%, Aldrich Chemical Co., Inc., Milwaukee, Wis.) and the membrane was left in the solvent for 24 hours at room temperature. The solvent uptake was 134.3% and the conductivity was $1.25 \times 10^{-3}$ S/cm.

Example 15

The membrane was treated in the manner of Example 14 except that the solvent was a 1:1 by volume mixture of 1-methyl-2-pyrrolidone and dimethyl sulfoxide. The solvent uptake was 132.2% and the conductivity was $1.52 \times 10^{-3}$ S/cm.

Example 16

The membrane was treated in the manner of Example 14 except that the solvent was a 1:1 by volume mixture of 1-methyl-2-pyrrolidone and dimethoxy-ethane. The solvent uptake was 100.0% and the conductivity was $1.35 \times 10^{-3}$ S/cm.

Example 17

The membrane was treated in the manner of Example 14 except that the solvent was a 1:1 by volume mixture of 1-methyl-2-pyrrolidone and gamma-butyrolactone. The solvent uptake was 86.5% and the conductivity was $1.18 \times 10^{-3}$ S/cm.

Example 18

The membrane was treated in the manner of Example 14 except that the solvent was a 1:1 by volume mixture of 1-methyl-2-pyrrolidone and dimethyl formamide. The solvent uptake was 136.5% and the conductivity was $2.07 \times 10^{-3}$ S/cm.

Example 19

The membrane was treated in the manner of Example 14 except that the solvent was a 1:1 by volume mixture of propylene carbonate and gamma-butyrolactone. The solvent uptake was 86.5% and the conductivity was $3.39 \times 10^{-4}$ S/cm.

Example 20

The membrane was treated in the manner of Example 14 except that the solvent was a 1:1 by volume mixture of propylene carbonate and dimethyl formamide. The solvent uptake was 129.4% and the conductivity was $2.59 \times 10^{-3}$ S/cm.

Example 21

The membrane was treated according to the method of Comparative Example 7 except that the solvent was a 1:1 by volume mixture of dimethoxyethane and ethylene carbonate and the membrane was left in the solvents for 24 hours at room temperature. The solvent uptake was 64.1% and the conductivity was $4.23 \times 10^{-4}$ S/cm.

Example 22

The membrane was treated according to the method of Comparative Example 7 except that the solvent was a 1:1 by volume mixture of gamma-butyrolactone and ethylene carbonate and the membrane was left in the solvents 5 for 24 hours at room temperature. The solvent uptake was 81.2% and the conductivity was $3.1 \times 10^{-4}$ S/cm.

Example 23

The membrane was treated according to the method of Comparative Example 7 except that the solvent was a 1:1 by volume mixture of dimethyl sulfoxide and ethylene carbonate and the membrane was left in the solvents for 24 hours at room temperature. The solvent uptake was 122.0% and the conductivity was $1.53 \times 10^{-3}$ S/cm.

Example 24

The membrane was treated according to the method of Comparative Example 7 except that the solvent was a 1:1 by volume mixture of ethylene carbonate, propylene carbonate, and dimethoxyethane and the membrane was left in the solvents for 3 hours at room temperature. The solvent uptake was 40.1% and the conductivity was $1.57 \times 10^{-4}$ S/cm.

Example 25

The membrane was treated according to the method of Comparative Example 7 except that the solvent was a 1:1 by volume mixture of gamma-butyrolactone and diethoxyethane (98%, Aldrich Chemical Co., Inc., Milwaukee, Wis.) and the membrane was left in the solvents for 24 hours at room temperature.

The solvent uptake was 56.2% and the conductivity was $1.34 \times 10^{-4}$ S/cm.

Example 26

The membrane was treated according to the method of Comparative Example 7 except that the solvent was a 1:1 by volume mixture of ethylene carbonate and diethoxyethane and the membrane was left in the solvents for 24 hours at room temperature. The solvent uptake was 75.0% and the conductivity was $1.65 \times 10^{-4}$ S/cm.

Example 27

The membrane was treated according to the method of Comparative Example 7 except that the solvent was dimethylacetamide (99.5+%, Alfa Aesar, Ward Hill, Mass.). The solvent uptake was 166.7% and the conductivity was $3.05 \times 10^{-3}$ S/cm.

Example 28

The membrane of Example 27 continued to be soaked in the dimethyl-acetamide for 4 days, at which point a quantity of N-methyl pyrrolidone was added to bring the total solvent composition up to 1:1 by volume. After an additional period 24 hours, the solvent uptake was 89.4% and the conductivity was $1.1\ 6 \times 10^{-3}$ S/cm.

Example 29

The membrane was treated according to the method of Comparative Example 7 except that the solvent was N,N'-dimethyl butyramide (98%, Lancaster Synthesis Inc., Windham, N.H.). The solvent uptake was 123.8% and the conductivity was $5.48 \times 10^{-4}$ S/cm.

Example 30

The membrane was treated according to the method of Comparative Example 7 except that the solvent was N,N'-Di-n-butylacetamide (98%, Lancaster Synthesis Inc., Windham, N.H.) and the membrane was left in the solvent for 16 days at room temperature. The solvent uptake was 243.7% and the conductivity was $1.41 \times 10^{-4}$ S/cm.

Example 31

The membrane was treated according to the method of Comparative Example 7 except that the solvent was triethylphosphate (99+%, Alfa Aesar, Ward Hill, Mass.). The solvent uptake was 154.4% and the conductivity was $3.45 \times 10^{-4}$ S/cm.

Example 32

A 1.0 cm by 1.5 cm membrane sample prepared in the manner of Comparative Example 7 was treated according to the method therein described, except that the solvent was a 1:1 by volume mixture of ethylene carbonate and propylene carbonate and the solvent was added to the membrane by dropping 40 microliters of solvent onto the surface of the film using a micropipette. The ionic conductivity was measured after 15 minutes and found to be $1.00 \times 10^{-4}$ S/cm.

Example 33

The membrane was treated according to the method of Comparative Example 7 except that the solvent was a 1:1 by volume mixture of propylene carbonate and dimethyl carbonate and the membrane was left in the solvent at room temperature for a period of 9 days. The solvent uptake was 28.8% and the conductivity was $1.32 \times 10^{-4}$ S/cm.

Example 34

The membrane was treated in the manner of Example 33 except that the solvent was a 1:1 by volume mixture of propylene carbonate and acetonitrile (99.8%, Aldrich Chemical Co., Inc., Milwaukee, Wis.). The solvent uptake was 30.4% and the conductivity was $1.19 \times 10^{-4}$ S/cm.

Example 35

A 1" by 1" sample of an 805 g/eq. flat membrane, 92 $\mu$m thick, formed from a copolymer of TFE and perfluoro (3-oxa-4pentene sulfonyl fluoride) was exposed to a saturated solution of LiOH (EM Science, Gibbstown, N.J.) in 1:1 by volume mixture of water and methanol (Reagent grade, EM Science, Gibbstown, N.J.) mixture at T=85° C. for 6 hours, after which the membrane was soaked in a 1:1 water:methanol solution overnight at room temperature, and then heated to T=60° C. for 4 hours in a fresh 1:1 water:methanol solution. After this, the membrane was dried in a recirculating nitrogen oven (Electric Hotpack Company, Inc., Model 633, Philadelphia, Pa.) at 100° C. for 96 hours.

The dried membrane was transferred to a sealed container while still warm and conveyed to a glove box having a positive pressure of dry nitrogen applied thereto, wherein the membrane was removed from the sealed container and allowed to come to room temperature. The membrane was then cut into several sections 1.0 cm by 1.5 cm in size.

A cooled 1.0 cm by 1.5 cm membrane sample was then soaked in an excess of propylene carbonate in a sealed glass vial for 3 hours at room temperature. The membrane was removed from the propylene carbonate bath, blotted with a paper towel to remove excess solvent, and tested using the four point probe test described above. Solvent uptake was determined by the method described above. Solvent uptake was 580.8%. Although solvent uptake was very high, a gel was not formed; the membrane retained its structural integrity. Conductivity was $4.57 \times 10^{-4}$ S/cm.

Example 36

A membrane sample prepared in the manner of Example 35 was treated according to the method therein described, except that the solvent was dimethoxy-ethane. The solvent uptake was 63.6% and the conductivity was $1.71 \times 10^{-4}$ S/cm.

Example 37

A membrane sample prepared in the manner of Example 35 was treated according to the method therein described, except that the solvent was a 1:1:1 by volume mixture of ethylene carbonate, propylene carbonate, and dimethoxyethane. The solvent uptake was 553.8%. Although solvent uptake was very high, a gel was not formed; the membrane retained its structural integrity. The conductivity was $6.81 \times 10^{-4}$ S/cm.

Example 38

A 1" by 1" flat film sample, 112 µm thick, of a 750 g/eq. copolymer of TFE and perfluoro(3,6-dioxa-4-methyl-7-octenesulfonyl fluoride) was exposed to a saturated solution of LiOH (EM Science, Gibbstown, N.J.) in 1:1 by volume mixture of water and methanol (Reagent grade, EM Science, Gibbstown, N.J.) mixture at T=85° C. for 6 hours, after which the membrane was soaked in a 1:1 water:methanol solution overnight at room temperature, and then heated to T=60° C. for 4 hours in a fresh 1:1 water:methanol solution. After this, the membrane was dried in a recirculating nitrogen oven (Electric Hotpack Company, Inc., Model 633, Philadelphia, Pa.) at 100° C. for 96 hours.

The dried membrane was transferred to a sealed container while still warm and conveyed to a glove box having a positive pressure of dry nitrogen applied thereto, wherein the membrane was removed from the sealed container and allowed to come to room temperature. The membrane was then cut into several sections 1.0 cm by 1.5 cm in size.

A cooled 1.0 cm by 1.5 cm membrane sample was then soaked in an excess of propylene carbonate in a sealed glass vial for 3 hours at room temperature. The membrane was removed from the n-methyl formamide bath, blotted with a paper towel to remove excess solvent, and tested using the four point probe test described above. Solvent uptake was determined by the method described above. Solvent uptake was 175.8%. Conductivity was $2.70 \times 10^{-4}$ S/cm.

Example 39

A membrane sample prepared in the manner of Example 38 was treated according to the method therein described, except that the solvent was a 1:1 by volume mixture of ethylene carbonate and propylene carbonate. The solvent uptake was 176.5% and the conductivity was $3.40 \times 10^{-4}$ S/cm.

Example 40

A membrane sample prepared in the manner of Example 38 was treated according to the method therein described, except that the solvent was a 1:1 by volume mixture of ethylene carbonate, propylene carbonate, and dimethoxyethane. The solvent uptake was 145.5% and the conductivity was $7.47 \times 10^{-4}$ S/cm.

Example 41

A 1" by 1" flat film sample, 125 µm thick, of an 834 g/eq. copolymer of TFE and perfluoro(3,6-dioxa-4-methyl-7-octenesulfonyl fluoride) was exposed to an excess of LiOH (98%, Aldrich Chemical Co., Inc., Milwaukee, Wis.), 2.0 molar in 86% water and 14% DMSO (GR grade, EM Science,Gibbstown, N.J.) mixture at T=80° C. for 4.75 hours, after which the membrane was washed in distilled water three times for 30 minutes at T=80° C., and dried in a recirculating nitrogen oven (Electric Hotpack Company, Inc., Model 633, Philadelphia, Pa.) at 100° C. for 96 hours.

The dried membrane was transferred to a sealed container while still warm and conveyed to a glove box having a positive pressure of dry nitrogen applied thereto, wherein the membrane was removed from the sealed container and allowed to come to room temperature. The membrane was then cut into several sections 1.0 cm by 1.5 cm in size.

A cooled 1.0 cm by 1.5 cm membrane sample was then soaked in an excess of propylene carbonate in a sealed glass vial for 24 hours at room temperature. The membrane was removed from the propylene carbonate bath, blotted with a paper towel to remove excess solvent, and tested using the four point probe test described above. Solvent uptake was determined by the method described above. Solvent uptake was 187.1%. Conductivity was $2.76 \times 10^{-4}$ S/cm.

Example 42

A membrane sample prepared in the manner of Example 41 was treated according to the method therein described, except that the solvent was gamma-butyrolactone. The solvent uptake was 184.4% and the conductivity was $7.30 \times 10^{-4}$ S/cm.

Example 43

A membrane sample prepared in the manner of Example 41 was treated according to the method therein described, except that the solvent was dimethyl sulfoxide. The solvent uptake was 386.1% and the conductivity was $1.65 \times 10^{-3}$ S/cm.

Example 44

A 2" by 2" sample of a terpolymer of TFE, 17.8 mol-% perfluoro(3,6-dioxa-4-methyl-7-octenesulfonyl fluoride), and 9.6 mol-% perfluoro methyl vinyl ether synthesized according to the method described in Connoly et al, U.S. Pat. No. 3,282,875, was exposed to an excess of LiOHl (98%, Aldrich Chemical Co., Inc., Milwaukee, Wis.), 2.0 molar in 86% water and 14% DMSO (GR grade, EM Science, Gibbstown, N.J.) mixture at T=80° C. for 4.75 hours, after which the membrane was washed in distilled water three times for 30 minutes at T=80° C., and dried in a recirculating nitrogen oven (Electric Hotpack Company, Inc., Model 633, Philadelphia, Pa.) at 100° C. for 96 hours.

The dried membrane was transferred to a sealed container while still warm and conveyed to a glove box having a positive pressure of dry nitrogen applied thereto, wherein the membrane was removed from the sealed container and allowed to come to room temperature. The membrane was then cut into several sections 1.0 cm by 1.5 cm in size.

A cooled 1.0 cm by 1.5 cm membrane sample, 175 µm thick, was then soaked in an excess of propylene carbonate in a sealed glass vial for 24 hours at room temperature. The membrane was removed from the propylene carbonate bath, blotted with a paper towel to remove excess solvent, and tested using the four point probe test described above. Solvent uptake was determined by the method described above. Solvent uptake was 146.9%. Conductivity was $3.1 \times 10^{-4}$ S/cm.

Example 45

A membrane sample prepared in the manner of Example 44 was treated according to the method therein described, except that the solvent was gamma-butyrolactone. The solvent uptake was 173.2% and the conductivity was $6.70 \times 10^{-4}$ S/cm.

Example 46

A membrane sample prepared in the manner of Example 44 was treated according to the method therein described, except that the solvent was dimethyl sulfoxide. The solvent uptake was 528.2%. Although solvent uptake was very high, a gel was not formed; the membrane retained its structural integrity. The conductivity was $1.15 \times 10^{-3}$ S/cm.

Example 47

A membrane sample prepared in the manner of Example 41 was treated according to the method therein described, except that the solvent was a 1:1 by volume mixture of ethylene carbonate and dimethyl carbonate and the sample was left in the solvents for a period of two hours. The solvent uptake was 88.9% and the conductivity was $1.81 \times 10^{-4}$ S/cm.

Example 48

A membrane sample prepared in the manner of Example 44 was treated according to the method therein described, except that the solvent was a 1:1 mixture of ethylene carbonate, dimethyl carbonate, and dimethoxyethane and the sample was left in the solvent for 48 hours at room temperature. The solvent uptake was 141.4% and the conductivity was $9.32 \times 10^{-4}$ S/cm.

Example 49

A 1" by 1" flat film sample, 77 $\mu$m thick, of 890 g/eq. copolymer of TFE and perfluoro(3,6-dioxa-4-methyl-7-octenesulfonyl fluoride)was exposed to an excess of LiOH (98%, Aldrich Chemical Co., Inc., Milwaukee, Wis.), 2.0 molar in 86% water and 14% DMSO (GR grade, EM Science,Gibbstown, N.J.) mixture at T=80° C. for 4.75 hours, after which the membrane was washed in distilled water three times for 30 minutes at T=80° C., and dried in a recirculating nitrogen oven (Electric Hotpack Company, Inc., Model 633, Philadelphia, Pa.) at 100° C. for 96 hours.

The dried membrane was transferred to a sealed container while still warm and conveyed to a glove box having a positive pressure of dry nitrogen applied thereto, wherein the membrane was removed from the sealed container and allowed to come to room temperature. The membrane was then cut into several sections 1.0 cm by 1.5 cm in size.

A cooled 1.0 cm by 1.5 cm membrane sample was then soaked in an excess of a 1:1 by volume mixture of ethylene carbonate and dimethyl carbonate in a sealed glass vial for 48 hours at room temperature. The membrane was removed from the solvent bath, blotted with a paper towel to remove excess solvent, and tested using the four point probe test described above. Solvent uptake was determined by the method described above. Solvent uptake was 72.0%. Conductivity was $1.51 \times 10^{-4}$ S/cm.

Example 50

A membrane sample prepared in the manner of Example 49 was treated according to the method therein described, except that the solvent was a 1:1 by volume mixture of ethylene carbonate and propylene carbonate. The solvent uptake was 115.0% and the conductivity was $4.44 \times 10^{-4}$ S/cm.

Example 51

A dispersion of a 1070 g/equivalent copolymer of TFE and perfluoro(3,6-dioxa-4-methyl-7-octenesulfonyl fluoride) hydrolyzed to the acid form by the method of Comparative Example 1 was prepared using a mixture of methanol, 1-propanol, and water following U.S. Pat. No. 4,453,991. The solvents were removed by rotary evaporation until the solution became highly viscous, and then ethanol was added to give a solution containing 5.2 wt % of the acid polymer, 5% water, and approximately 90% ethanol. The acid was neutralized to form the lithium ionomer by adding 8.7 ml of 1.9 M aqueous lithium hydroxide to 400 g of the acid polymer dispersion. During this neutralization, the pH was observed to rise from 1.7 to 7.2. Propylene carbonate (PC, 5 g) and 1-butanol (100 g) were added, and the mixture subjected to rotary evaporation at 50° C. The dispersion was concentrated until it contained 18% ionomer, 3.5% propylene carbonate, and the remainder mostly 1-butanol.

Separator film was prepared by casting the above dispersion onto a base film of TEFLON® PFA, available from the DuPont company, using a doctor blade with 0.75 mm gate height. After drying in ambient air, films of 50–55 pm thickness were obtained.

Cathode film was prepared by combining 40 g of the 18% Li-ionomer dispersion in PC/butanol, 6.9 g of spinel $LiMn_2O_4$, and 0.69 g of SP carbon black. The mixture was stirred for several hours. 5 ml of 1-butanol were added to the paste, and it was cast onto a film base of TEFLON FEP, available from the DuPont Company, using a doctor knife with a 1 mm high gate. The cathode was dried in ambient air to give a coating weight of 21 mg/cm$^2$.

Anode film was prepared by combining 40 g of a 15.6% Li-Nafion dispersion in propylene carbonate/1-butanol, with 6.93 of Mesophase Carbon Micro Beads (MCMB 25–28 Osaka Gas, Alumina Trading Co, Park Ridge, N.J.), and 0.69 g of SP carbon black. The mixture was stirred for 4 hours. Anodes were cast on to PFA film base using a doctor knife with a gate height of 0.75 mm to give films with coating weight of 16 mg/cm$^2$.

The current collectors were made from flattened expanded metal mesh (Delker, Branford, Conn.), using copper for the anode collector and aluminum for the cathode collector. The aluminum collectors were pre-coated with an adhesion-promoter made from ADCOTE 50C12 (Morton International, Chicago, Ill.) with SP carbon black and diluted with ethanol.

A cell of 25 cm$^2$ area was laminated together as S/Cu/A/S/S/C/Al/C, where S, A, and C are separator, anode, and cathode films described above. The laminator (Western Magnum XRL-14, El Segundo, Calif.) used rubber-covered rollers heated to 140° C. and with a pressure of 2.8 lb. per inch of nip width. The laminate was dried by heating to 120° C. under vacuum for 1 hour. In a nitrogen-filled glove box, the laminate was soaked in a mixture of 1:1 by weight ethylene carbonate: 1,2-dimethoxyethane for 30 min. at ambient temperature, during which the weight of the laminate increased from 2.76 to 3.25 g. The laminate was sealed in an aluminum/polyethylene bag with the copper and aluminum mesh tabs protruding from the bag.

The cell was charged using a constant current of 10 mA to 4.2 V, at which point the voltage was held constant until the current dropped below 1 mA. Ihe charge delivered was 62 mAh. The cell was discharged at constant current of 10 mA to 2.8 V, delivering 31 mAh. It was subsequently charged and discharged for 26 cycles between voltage limits of 2.8 and 4.2 V. The charging and discharging were performed with a constant current of 5 mA until the voltage limit was reached, followed by constant voltage until the current dropped below 0.5 mA. Capacity at the 26th cycle was 26 mAh.

Examples 52–63

In these examples it is shown that, CPV, the conductivity calculated from solvent parameters and actual % weight uptake, correlates well with the actual measured conductivity. Further, it is seen from these examples that when the calculated conductivity exceeded 0.3 mS/cm, the measured conductivity exceeded 0.1 mS/cm.

Nafion® 117, an 1100 g/eq. perfluoro ion exchange membrane available from DuPont, Wilmington Del., was converted to the lithium ionomer by the methods hereinabove described, and exposed to the solvents listed in Table 8. Calculated and experimentally measured results are shown in Table 8.

TABLE 8

Measured Conductivity vs. Calculated Conductivity (CPV) For Nafion ® 117 In Selected Solvents

| | | | | Dielectric | | % Weight | Donor | Conductivity | |
| | | | | | | | | Calculated | Measured |
| Example # | Solvent | MW | Density | Constant | Viscosity | Uptake | Number | (mS/cm) | (mS/cm) |
| --- | --- | --- | --- | --- | --- | --- | --- | --- | --- |
| 52 | DMF | 73.1 | 0.944 | 36.71 | 0.8 | 225 | 26.6 | 5.90 | 3.09 |
| 53 | DMA | 87.12 | 0.937 | 37.78 | 0.84 | 167 | 27.8 | 1.99 | 3.05 |
| 54 | DMSO | 78.13 | 1.101 | 46.68 | 1.1 | 136 | 29.8 | 1.10 | 1.52 |
| 55 | NMP | 99.15 | 1.03 | 32 | 1.67 | 134 | 27.3 | 0.52 | 1.13 |
| 56 | GBL | 86.09 | 1.13 | 39.1 | 1.75 | 88 | 16.6 | 0.19 | 0.48 |
| 57 | EC | 88.06 | 1.41 | 89.6 | 1.85 | 71 | 16.4 | 0.11 | 0.14 |
| 58 | DME | 90.12 | 0.87 | 7.2 | 0.46 | 29 | 20 | 0.02 | 0.10 |
| 59 | PC | 102.09 | 1.21 | 64.4 | 2.53 | 65 | 15.1 | 0.05 | 0.02 |
| 60 | MF | 60.05 | 0.974 | 8.5 | 0.33 | 16 | 16.5 | 0.01 | 0.01 |
| 61 | THF | 72.11 | 0.889 | 7.58 | 0.46 | 23 | 20 | 0.01 | 0.01 |
| 62 | ACN | 41.05 | 0.782 | 37.5 | 0.33 | 19 | 14.1 | 0.02 | 0.01 |
| 63 | TEP | 182.16 | 1.072 | 13.3 | 2.147 | 154 | 26 | 0.36 | 0.35 |

What is claimed is:

1. A highly fluorinated lithium ion exchange polymer electrolyte membrane (FLIEPEM) exhibiting a conductivity of at least 0.1 mS/cm comprising:

a highly fluorinated lithiumn ion exchange polymer membrane (FLIEPM), the polymer having pendant fluoroalkoxy lithium sulfonate groups, and wherein the polymer is either completely or partially cation exchanged; and, at least one aprotic solvent imbibed in said membrane, the FLIEPEM being characterized by a conductivity parameter value (CPV) of 0.3 or greater.

2. A highly fluorinated lithium ion exchange polymer electrolyte membrane (FLIEPEM) comprising a highly fluorinated lithium ion exchange polymer membrane (FLIEPM), the polymer having pendant fluoroalkoxy lithium sulfonate groups, wherein the polymer is either completely or partially cation exchanged; and at least one aprotic solvent imbibed in said membrane, the FLIEPEM being characterized by a conductivity of at least 0.1 mS/cm, the aprotic solvent or solvents being selected from the group consisting of dimethyl formamide (DMF), dimethoxyethane (DME), ethylene carbonate (EC), propylene carbonate (PC), dimethyl sulfoxide (DM SO), gamma-butyrolactone (GBL), N,N'-dimethyl-propyleneurea (DMPU), 1-methyl-2-pyrrolidone (NMP), dimethyl acetamide (DMA), N,N'-dimcthyl butyramide (DMB), triethylphosphate (TEP), n,n'-di-n-butylacetamide (DBA), and mixtures thereof; or being a mixture of PC with a solvent selected from the group consisting of DME, EC, GBL, dimethyl carbonate (DMC), and acrylonitrile (ACN); or being a mixture of EC with a solvent selected from the group consisting of DME, GBL, DMSO, diethoxyethane (DEE), and DMC; or being a mixture of NMP with a solvent selected from the group consisting of DME, DMSO, GBL, DMF, and DMA; or being a mixture of GBL with DEE or DME; or being a mixture of EC and DME with a solvent selected from the group consisting of diethyl carbonate (DEC), DMC, and PC or being a mixture of DMF and a solvent selected from the group consisting of DMA, DMSO, NMP, methyl glycolate (MG), GBL, TEP, EC, DME, PC, methyl formate (MF), tetrahydrofuran (THF), sulfolane (SULF), DMC, ACN, methyl acetate (MA), DEC, 1,3-dioxolane (DIOX), DEE, ethyl aerylate (EA), and dimethyl sulfite (DMSU); or being a mixture of DMA and a solvent selected from the group consisting of DMSO, NMP, MG, GBL, TEP, EC, DME, PC, MF, THF, SULF, DMC, ACN, MA, DEC, DIOX, DEE, EA, and DMSU; or being a mixture of DMSO and a solvent selected from the group consisting of NMP, MG, GBL, TEP, EC, DME, PC, MF, THF, SULF, DMC, ACN, MA, DEC, DIOX, DEE, EA, and DMSU; or being a mixture of NMP and a solvent selected from the group consisting of MG, GBL, TEP, EC, DME, PC, MF, THF, SULF, DMC, ACN, MA, DEC, DIOX, DEE, EA, and DMSU; or being a mixture of MG and a solvent selected from the group consisting of GBL, TEP, EC, DME, PC, MF, THF, SULF, DMC, ACN, MA, DEC, DIOX, DEE, EA, and DMSU; or being a mixture of GBL and a solvent selected from the group consisting of TEP, EC, DME, PC, MF, THF, ACN, MA, DEC, DIOX, and EA; or being a mixture of TEP and a solvent selected from the group consisting of EC, PC, SULF, ACN, and DMSU; or being a mixture of EC and DME; or being a mixture of DME and either ACN or DMSU or being a mixture of EC, DMF and a solvent selected from the group consisting of DMA, DMSO, NMP, MG, GBL, TEP, DME, PC, MF, THF, SULF, DMC, ACN, MA, DEC, DIOX, DEE, EA, and DMSU; or being a mixture of EC, DMA and a solvent selected from the group consisting of DMSO, NMP, MG, GBL, TEP, DME, PC, MF, THF, SULF, DMC, ACN, MA, DEC, DIOX, DEE, EA, and DMSU; or being a mixture of EC, DMSO and a solvent selected from the group consisting of NMP, MG, GBL, TEP, DME, PC, MF, THF, SULF DMC, ACN, MA, DEC, DIOX, DEE, EA, DMSU; or being a mixture of EC, NMP and a solvent selected from the group consisting of MG, GBL, TEP, DME, PC, MF, THF, SULF, DMC, ACN, MA, DEC, DIOX, DEE, EA, and DMSU; or being a mixture of EC, MG and a solvent selected from the group consisting of GBL, TEP, DME, PC, MF, THF, SULF, DMC, ACN, MA, DEC, DIOX, DEE, EA, and DMSU; or being a mixture of EC, GBL and a solvent selected from the group consisting of TEP, DME, PC, MF, THF, SULF, DMC, ACN, MA, DEC, DIOX, DEE, EA, and DMSU; or being a mixture of EC, TEP and a solvent selected from the group consisting of DME, PC, ME, THF, SULF, DMC, ACN, MA, DEC, DIOX, DEE, EA, and DMSU; or being a mixture of EC, DME and a solvent selected from the group consisting of MF, THF, SULF, DMC, ACN, MA, DEC, DIOX, DEE, EA, and DMSU; or being a mixture of EC, MF and either DEC or DIOX; or being a mixture of EC, THF and either DEC or DIOX; or being a mixture of EC, DMC and DIOX; or being a mixture of EC, DEC and DIOX; or being a mixture of PC, DMF and a solvent selected from the group consisting of DMA, DMSO, NMP, MG, GBL, TEP, EC, DME, ME, THF, SULF, DMC, ACN, MA, DEC, DIOX, DEE, EA, and DMSU; or being a mixture of PC, DMA and a solvent selected from the group consisting of DMSO, NMP, MG, GBL, TEP, EC, DME, MF, THF, SULF, DMC, ACN, MA, DEC, DIOX, DEE, EA, and DMSU; or being a mixture of PC, DMSO and a solvent selected from the group consisting of NMP, MG, GBL, TEP, EC, DME, ME, THF, SULF, DMC, ACN, MA, DEC, DIOX, DEE, EA, and DMSU; or being a mixture of PC, NMP and a solvent selected from the group consisting of MG, GBL, TEP, EC, DME, MF, THF, SULF, DMC, ACN, MA, DEC, DIOX, DEE, EA, and DMSU; or being a mixture of PC, MG and a solvent selected from the group consisting of GBL, TEP, EC, DME, MF, THF, SULF, DMC, ACN, MA, DEC, DIOX, DEE, EA, and DMSU; or being a mixture of PC, GBL and a solvent selected from the group consisting of TEP, EC, DME, MF, THF, DMC, ACN, MA, DEC, DIOX, DEE, EA, and DMSU; or being a mixture of PC, TEP and a solvent selected from the group consisting of EC, DME, MF, THF, SULF, DMC, ACN, MA, DEC, DIOX, DEE, EA, and DMSU; or being a mixture of PC, DME and a solvent selected from the group consisting of THF, DEC, and DIOX; or being a mixture of DMC, DMA and a solvent selected from the group consisting of DMSO, NMP, MG, GBL, TEP, EC, DME, PC, MF, THF, SULF, ACN, MA, DEC, DIOX, DEE, EA, and DMSU; or being a mixture of DMC, DMSO and a solvent selected from the group consisting of NMP, MG, GBL, TEP, EC, DME, PC, MF, THF, SULF, ACN, MA, DEC, DIOX, DEE, EA, and DMSU; or being a mixture of DMC, NMP and a solvent selected from the group consisting of MG, GBL, TEP, EC, DME, PC, MF, THF, SULF, ACN, MA, DEC, DIOX, DEE, EA, and DMSU; or being a mixture of DMC, MG and a solvent selected from the group consisting of GBL, TEP, EC, DME, PC, MF, THF, SULF, ACN, MA, DEC, DIOX, DEE, EA, and DMSU; or being a mixture of DMC, GBL and a solvent selected from the group consisting of TEP, EC, DME, PC, MF, THF, ACN, MA, DEC, DIOX, and EA; or being a mixture of DMC, TEP and a solvent selected from the group consisting of EC, PC, SULF, and ACN; or being a mixture of DMC, EC and either DME or DIOX; or being a mixture of DMC, DME and ACN or being a mixture of DME, DMF and a solvent selected from the group consisting of DMA, DMSO, NMP, MG, GBL, TEP, EC, PC, MF, THF, SULF, DMC, ACN, MA, DEC, DIOX, DEE, EA, and DMSU; or being a mixture of DME, DMA and a solvent selected from the group consisting of DMSO, NMP, MG, GBL, TEP, EC, PC, MF, THF, SULF, DMC, ACN, MA, DEC, DIOX, DEE, EA, and DMSU; or being a mixture of DME, DMSO and a solvent selected from the group consisting of NMP, MG, GBL, TEP, EC, PC, MF, THF, SULF, DMC, ACN, MA, DEC, DIOX, DEE, EA, and DMSU, or being a mixture of DME, NMP and a solvent selected from the group consisting of MG, GBL, TEP, EC, PC, MF, THF, SULF, DMC, ACN, MA, DEC, DIOX, DEE, FA, and DMSU; or being a mixture of DME, MG and a solvent selected from the group consisting of GBL, TEP, EC, PC, MF, THF, SULF, DMC, ACN, MA, DEC, DIOX, DEE, EA, and DMSU; or being a mixture of DME, GBL and a solvent selected from the group consisting of TIEP, EC, PC, MF, THF, SULF, DMC, ACN, MA, DEC, DIOX, DEE, EA, and DMSU; or being a mixture of DME, TEP and a solvent selected from the group consisting of EC, PC, SULF, ACN, and DMSU; or being a mixture of DME, EC and a solvent selected from the group consisting of MF, THF, SULF, DMC, ACN, MA, DEC, DIOX, DEE, EA, and DMSU; or being a mixture of DME, PC and a solvent selected from the group consisting of THF, DEC, and DIOX; or being a mixture of DME, MF and either SULF or ACN; or being a mixture of DME, THF and either SULF or ACN; or being a mixture of DME, SULF and either DEC or DIOX; or being a mixture of DME, DMC and ACN; or being a mixture of DME, ACN and a solvent selected from the group consisting of MA, DEC, DIOX, DEE, EA, and DMSU.

3. The FLIEPEM of claim 2, the solvent or solvents being selected from the group consisting of DMF, DME, EC, PC, DMSO, GBL, DMPU, NMP, DMA, DMB, TEP, DBA, and mixtures thereof; or being a mixture of PC with a solvent selected from the group consisting of DME, EC, GBL, DMC, and ACN or being a mixture of EC with a solvent selected from the group consisting of DME, GBL, DMSO, DEE, and DMC; or being a mixture of NMP with a solvent selected from the group consisting of DME, DMSO, GBL, DMF, and DMA, or being a mixture of GBL with DEE or DME; or being a mixture of EC and DME with a solvent selected from the group consisting of DEC, DMC, and PC.

4. The FLIEPEM of claim 3, the solvent or solvents being selected from the group consisting of DMSO, DMF, PC, EC, NMP, GBL, and mixtures thereof, and mixtures thereof with at least one solvent selected from the group consisting of DMC, DME, and DEC.

5. The FLIEPEM of claim 4 wherein the solvent mixture comprises EC and DMC, or a mixture thereof with at least one additional solvent selected from the group consisting of GBL, PC, DEC, DMSO, and DME.

6. The FLIEPEM of claim 1 or claim 2 wherein the polymer is a perfluoro-olefin homopolymer or copolymer having pendant lithium sulfonate groups.

7. The FLIEPEM of claim 6 wherein the pendant groups are fluoroalkoxy sulfonates.

8. The FLIFEPEM of claim 6 wherein the polymer is a copolymer comprising at least 50 mol-% of a non-ionic perfluoro-olefin comonomer.

9. The FLIEPEM of claim 8 wherein the copolymer comprises at least 70 mol-% of a non-ionic per fluoro-olefin comonomer.

10. The FLIEPEM of claim 9 wherein the copolymer comprises at least 80 mol-%, of a non-ionic per fluoro-olefin comonomer.

11. A process for forming a FLIEPEM, the process comprising contacting a FLIEPM with at least one aprotic solvent, in a dry environment, in a temperature range of −40 to 200° C., the solvent and polymer combination having a CPV of at least 0.3 mS/cm, to form a FLIEPEM with a conductivity of at least 0.1 mS/cm.

12. A process for forming a FLIEPEM, the process comprising contacting a FLIEPM in at least one aprotic solvent, in a dry environment, in a temperature range of −40 to 200° C., to form a FLIEPEM with a conductivity of at least 0.1 mS/cm; the solvent or solvents being selected from the group consisting of dimethyl formamide (DMF), dimethoxyethane (DME), ethylene carbonate (EC), propylene carbonate (PC), dimethyl sulfoxide (DMSO), gamma-butyrolactone (GBL), N,N'-dimethylpropyleneurea (DMPU), I-methyl-2-pyrrolidone (NMP), dimethyl acetamide (DMA), N,N'-dimethyl butyramide (DMB), triethylphosphate (TEP), n,n'-di-n-butylacetamide (DBA), and mixtures thereof; or being a mixture of PC with a solvent selected from the group consisting of DME, EC, GBL, dimethyl carbonate (DMC), and acrylonitrile (ACN); or being a mixture of PC with a solvent selected from the group consisting of DME, GBL, DMSO, diethoxyethane (DEE), and DMC; or being a mixture of NMP with a solvent selected from the group consisting of DME, DMSO, GBL, DMF, and DMA; or being a mixture of GBL with DEE or DME; or being a mixture of EC and DME with a solvent selected from the group consisting of diethyl carbonate (DEC), DMC, and PC or being a mixture of DMF and a solvent selected from the group consisting of DMA, DMSO, NMP, methyl glycolate (MG), GBL, TEP, EC, DME, PC, methyl formate (MF), tetrahydrofuran (THF), sulfolane (SUILF), DMC, ACN, methyl acetate (MA), DEC, 1,3-dioxolane (DIOX), DEE, ethyl acrylate (EA), and dimethyl sulfite (DMSU); or being a mixture of DMA and a solvent selected from the group consisting of DMSO, NMP, MG, GBL, TEP, EC, DMP, PC, MF, THF, SULF, DMC, ACN, MA, DEC, DIOX, DEE, EA, and DMSU; or being a mixture of DMSO and a solvent selected from the group consisting of NMP, MG, GBL, TEP, EC, DME, PC, MF, THF, SULF, DMC, ACN, MA, DEC, DIOX, DEE, EA, and DMSU; or being a mixture of NMP and a solvent selected from the group consisting of MG, GBL, TEP, EC, DME, PC, MF, THF, SULF, DMC, ACN, MA, DEC, DIOX, DEE, EA, and DMSU; or being a mixture of MG and a solvent selected from the group consisting of GBL, TEP, EC, DME, PC, MF, THF, SULF, DMC, ACN, MA, DEC, DIOX, DEE, EA, and DMSU; or being a mixture of GBL and a solvent selected from the group consisting of TEP, EC, DME, PC, ME, THF,ACN, MA, DEC, DIOX, and EA; or being a mixture of TEP and a solvent selected from the group consisting of EC, PC, SULF, ACN, and DMSU; or being a mixture of EC and DME; or being a mixture of DME and either ACN or DMSU or being a mixture of EC, DMF and a solvent selected from the group consisting of DMA, DMSO, NMP, MG, GBL, TEP, DME, PC, MF, THF, SULF, DMC, ACN, MA, DEC, DIOX, DEE, EA, and DMSU; or being a mixture of EC, DMA and a solvent selected from the group consisting of DMSO, NMP, MG, GBL, TEP, DME, PC, MF, THF, SULF, DMC, ACN, MA, DEC, DIOX, DEE, EA, and DMSU; or being a mixture of EC, DMSO and a solvent selected from the group consisting of NMP, MG, GBL, TEP, DME, PC, MF, THF, SULF, DMC, ACN, MA, DEC, DIOX, DEE, EA, DMSU; or being a mixture of EC, NMP and a solvent selected from the group consisting of MG, GBL, TEP, DME, PC, MF, THF, SULF, DMC, ACN, MA, DEC, DIOX, DEE, EA, and DMSU; or being a mixture of EC, MG and a solvent selected from the group consisting of GBL, TEP, DME, PC, MF, THF, SULF, DMC, ACN, MA, DEC, DIOX, DEE, EA, and DMSU; or being a mixture of EC, GBL and a solvent selected from the group consisting of TEP, DME, PC, MF, THF, SULF, DMC, ACN, MA, DEC, DIOX, DEE, EA, and DMSU; or being a mixture of EC, TEP and a solvent selected from the group consisting of DME, PC, MF, THF, SULF, DMC, ACN, MA, DEC, DIOX, DEE, EA, and DMSU; or being a mixture of EC, DME and a solvent selected from the group consisting of MF, THF, SULF, DMC, ACN, MA, DEC, DIOX, DEE, EA, and DMSU; or being a mixture of EC, MF and either DEC or DIOX; or being a mixture of EC, THF and either DEC or DIOX; or being a mixture of EC, DMC and DIOX; or being a mixture of EC, DEC and DIOX; or being a mixture of PC, DMF and a solvent selected from the group consisting of DMA, DMSO, NMP, MG, GBL, TEP, EC, DME, MF, THF, SULF, DMC, ACN, MA, DEC, DIOX, DEE, EA, and DMSU; or being a mixture of PC, DMA and a solvent selected from the group consisting of DMSO, NMP, MG, GBL, TEP, EC, DME, MF, THF, SULF, DMC, ACN, MA, DEC, DIOX, DEE, EA, and DMSU; or being a mixture of PC, DMSO and a solvent selected from the group consisting of NMP, MG, GBL, TEP, EC, DME, MF, THF, SULF, DMC, ACN, MA, DEC, DIOX, DEE, EA, and DMSU; or being a mixture of PC, NMP and a solvent selected from the group consisting of MG, GBL, TEP, EC, DME, MF, THF, SULF, DMC, ACN, MA, DEC, DIOX, DEE, EA, and DMSU; or being a mixture of PC, MG and a solvent selected from the group consisting of GBL, TEP, EC, DME, MF, THF, SULF, DMC, ACN, MA, DEC, DIOX, DEE, EA, and DMSU; or being a mixture of PC, GBL and a solvent selected from the group consisting of TEP, EC, DME, MF, THF, DMC, ACN, MA, DEC, DIOX, DEE, EA, and DMSU; or being a mixture of PC, TEP and a solvent selected from the group consisting of FC, DME, MF, THF, SULF, DMC, ACN, MA, DEC, DIOX, DEE, EA, and DMSU; or being a mixture of PC, DME and a solvent selected from the group consisting of THF, DEC, and DIOX; or being a mixture of DMC, DMA and a solvent selected from the group consisting of DMSO, NMP, MG, GBL, TEP, EC, DME, PC, MF, THF, SULF, ACN, MA, DEC, DIOX, DEE, EA, and DMSU; or being a mixture of DMC, DMSO and a solvent selected from the group consisting of NMP, MG, GBL, TEP, EC, DME, PC, MF, THF, SULF, ACN, MA, DEC, DIOX, DEE, EA, and DMSU; or being a mixture of DMC, NMP and a solvent selected from the group consisting of MG, GBL, TEP, EC, DME, PC, MF, THF, SULF, ACN, MA, DEC, DIOX, DEE, EA, and DMSU; or being a mixture of DMC, MG and a solvent selected from the group consisting of GBL, TEP, EC, DME, PC, MF, THF, SULF, ACN, MA, DEC, DIOX, DEE, EA, and DMSU; or being a mixture of DMC, GBL and a solvent selected from the group consisting of TEP, EC, DME, PC, MF, THF, ACN, MA, DEC, DIOX, and EA; or being a mixture of DMC, TEP and a solvent selected from the group consisting of EC, PC, SULF, and ACN; or being a mixture of DMC, EC and either DME or DIOX; or being a mixture of DMC, DME and ACN or being a mixture of DME, DME and a solvent selected from the group consisting of DMA, DMSO, NMP, MG, GBL, TEP, EC, PC, MF, THF, SULF, DMC, ACN, MA, DEC, DIOX, DEE, EA, and DMSU; or being a mixture of DME, DMA and a solvent selected from the group consisting of DMSO, NMP, MG, GBL, TEP, BIC, PC, ME, THF, SULF, DMC, ACN, MA, DEC, DIOX, DEE, EA, and DMSU; or being a mixture of DME, DMSO and a solvent selected from the group consisting of NMP, MG, GBL, TFP, EC, PC, MF, THF, SULF, DMC, ACN, MA, DEC, DIOX, DEE, EA, and DMSU; or being a mixture of DME, NMP and a solvent selected from the group consisting of MG, GBL, TEP, EC, PC, MF, THF, SULF, DMC, ACN, MA, DEC, DIOX, DEE, EA, and DMSU; or being a mixture of DME, MG and a solvent selected from the group consisting of GBL, TEP, EC, PC, MF, THF, SULF, DMC, ACN, MA, DEC, DIOX, DEE, EA, and DMSU; or being a mixture of DME, GBL and a solvent selected from the group consisting of TEP, EC, PC, MF, THF, SULF, DMC, ACN, MA, DEC, DIOX, DEE, EA, and DMSU; or being a mixture of DME, TEP and a solvent selected from the group consisting of EC, PC, SULF, ACN, and DMSU; or being a mixture of DME, EC and a solvent selected from the group consisting of MF, THF, SULF, DMC, ACN, MA, DEC, DIOX, DEE, EA, and DMSU; or being a mixture of DME, PC and a solvent selected from the group consisting of THIF, DEC, and DIOX; or being a mixture of DME, MEX and either SULF or ACN; or being a mixture of DME, THF and either SULF or ACN; or being a mixture of DMB, SULF and either DEC or DIOX; or being a mixture of DME, DMC and ACN; or being a mixture of DME, ACN and a solvent selected from the group consisting of MA, DEC, DIOX, DEE, EA, and DMSU.

13. The process of claim 12 the solvents or solvents being selected from the group consisting of DMF, DME, EC, PC, DMSO, GBL, DMPU, NMP, DMA, DMB, TEP, DBA, and mixtures thereof; or being a mixture of PC with a solvent selected from the group consisting of DME, EC, GBL, DMC, and ACN or_being a mixture of EC with a solvent selected from the group consisting of DME, GBL, DMSO, DEE, and DMC; or being a mixture of NMP with a solvent selected from the group consisting of DME, DMSO, GBL, DMF, and DMA; or being a mixture of GBL with DEE or DME; or being a mixture of EC and DME with a solvent selected from the group consisting of DEC, DMC, and PC.

14. The process of claim 13, the solvent or solvents being selected from the group consisting of DMSO, DMF, PC, EC, NMP, GBL, and mixtures thereof, and mixtures thereof with at least one solvent selected from the group consisting of DMC, DME, and DEC.

15. The process of claim 14 wherein the solvent comprises a mixture of: EC and DMC or mixtures thereof with at least one additional solvent selected from the group consisting of GBL, PC, DEC, DMSO, and DME.

16. A lithium ion battery comprising one or more electrochemical cells comprising a positive electrode, a negative electrode, and a FLIEPEM disposed between the positive electrode and negative electrode, and in ionically conductive contact therewith, and a means for connecting the electrodes with an external electrical load or source.

17. The battery of claim 16 wherein the battery is rechargeable.

18. A porous electrode comprising particles of an electrode-active material, a highly fluorinated lithium ion exchange polymer and at least one aprotic solvent selected from the group consisting of dimethyl formamide (DMF), dimothoxyetharno (DME), ethylene carbonate (EC), propylene carbonate (PC), icimethyi sulfoxide (DMSO), gamma-butyrlactpne (GBL), N,N'-dimethyl-propy-tcneuroa (DMPU), 1-methyl-2-pyrrolidone-(NMP), dimethyl aetamide DMA, N,N'-dimethyl burtamide (DMB), tethylphosthate (TEP), n,n'-di-n-butylacetamide (DBA), and mixtures thereof, or beinge a mixture of PC with a solvent selected from the group consisting of DME, EC, GBL, dimeqthyl carbonate (DMC) and acrylonitrile (ACN); or being a mixture of EC with a solvent selected from the group consisting of DME, GBL, DMSO, diethoxytehane (DEE), and DMC; or being amixture of NMP with a solvent selected from the group consisting of DME, DMSO, GBL, DMF, and DMA; or being a mixture of GBL with DEE or DME; or being a mixture of EC and DME with a solvent selected from the group consisting of diethyl carbonate (DEC), DMC, and PC or being a mixture of DMF and a solvent selected from the group consisting of DMA, DMSO, NMP, methyl glycolate, (MG), GBL, TEP, EC, DME, PC methyl formate (MF), tetrahydrofuran (THF), sulfolane (SULF), DMC, ACN, methyl acetate (MA), DEC, 1,3-dioxolane (DIOX), D)EE, ethyl acrylate (EA), and dimethl sulfite (DMSU), or being a mixture of DMA and a solvent selected from the group consisting of DMSO, NMP, MG, GBL, TEP, EC, DME, PC, MF, THF, SULF, DMC, ACN, MA, DEC, DIOX, DEE, EA, and DMSU; or being a mixture of DMSO and a solvent selected from the grogg consistin of NMP, MG, GBL, TEP, EC, DME, PC, MF, THF, SULF, DMC, ACN, MA, DEC, DIOX, DEE, EA, and DMSU, or being a mixture of NMP and a solvent selected from the group consisting of MG, GBL, TEP, EC, DME, PC, MF, THF, SULF, DMC, ACN, MA, DEC, DIOX, DEE, EA, and DMSU; or being a mixtue of MG and a solvent selected from the group consistint of GBL, TEP, EC, DME, PC, MF, THF, SULF, DMC, ACN, MA, DEC, DIOX, DEE, EA, and DMSU, or being a mixture of GBL and a solvent selected from the gout, consisting pf TEP, EC, DME, PC, ME, THF, ACN, MA, DEC, DIOX, and EA; or being a mixture of TEP and a solvent selected from the group consisting of EC, PC, SULF, ACN, and DMSU or being a mixture of EC and DME; or being a mixture of DME and either ACN or DMSU or being a mixture of EC, DMF and a solvet selected from the group consisting of DMA, DMSO, NMP, MG, GBL, TEP, DME, PC, MF, THF, SULF, DMC, ACN, MA, DEC, DIOX, DEE, EA, and DMSU; or being a mixture of EC, DMA and a solvent selected from the group consisting of DMSO, NMP, MG, GBL, TEP, DME, PC, ME, THF, SULF, DMC, ACN, MA, DEC, DIOX, DEE, EA, and DMSU; or being a mixture of EC, DMSO and a solvent selected from the group consisting of NMP, MG, GBL, TEP, DME, PC, MF, THF, SULF, DMC, ACN, MA, DEC, DIOX, DEE, EA, DMSU or being a mixture of EC, NMP and a solvent selected from the group consisting of MG, GBL, TEP, DME, PC, MF, THF, SULF, DMC, ACN, MA, DEC, DIOX, DEE, EA, and DMSU; or being a mixture of EC, MG and a solvent-selected from the group consisting of GBL, TEP, DME, PC, MF, THF, SULF, DMC, ACN, MA, DEC, DIOX, DEE, EA, and DMSU: or being a mixture of EC, GBL and a solvent selected from the group consisting of TEP, DME, PC, MF, THF, SULF, DMC, ACN, MA, DEC, DIOX, DEE, EA, and DMSU; or being a mixture of EC, TEP and a solvent selected from the group consisting of DME, PC, MF, THF, SULF, DMC, ACN, MA, DEC, DIOX, DEE, EA, ad DMSU; or being a mixture of EC, DME and a solvent selected from the group consisting of MF, THF, SULF, DMC, ACN, MA, DEC, DIOX, DEE, EA, and DMSU; or being a mixture of EC, MF and either DEC or DIOX, or being a mixture of EC, THF and either DEC or DIOX; or being a mixture of EC, DMC and DIOX; or being a mixture of EC, DEC an DIOX; or being a mixture of PC, DMF anid a solvent selected from the group consisting of DMA, DMSO, NMP, MG, GBL TEP, EC, DME, MF, THF, SULF, DMC, ACN, MA, DEC, DIOX, DEE, EA, and DMSU; or being a mixture of PC, DMA and a solvent selected from the group consisting of DMSO, NMP, MG, GBL, TEP, EC, DME, MF, THF, SULF, DMC, ACN, MA, DEC, DIOX, DEE, EA, and DMSU, or being a mixture of PC, DMSO and a solvent selected from the group consisting of NMP, MG, GBL, TEP, EC, DME, MF, THF, SULF, DMC, ACN, MA, DEC, DIOX, DEE, EA, and DMSU, or being a mixture of PC, NMP and a solvent selected from the group consisting of MG, GBL, TEP, EC, DME, MF, THF, SULF, DMC, ACN, MA, DEC, DIOX, DEE, EA, and DMSU; or being a mixture of PC, MG and a solvent selected from the group consisting of GBL, TEP, EC, DME, MF, THF, SULF, DMC, ACN, MA, DEC, DIOX, DEE, EA, and DMSU, or being a mixture of PC, GBL and a solvent selected from the group consisting of TEP, EC, DME, MF, THF, DMC, ACN, MA, DEC, DIOX, DEE, EA, and DMSU; or being a mixture of PC, TEP and a solvent selected from the group consisting of EC, DME, MF, THF, SULF, DMC, ACN, MA, DEC, DIOX, DEE, EA, and DMSU; or being a mixture of PC, DME and a solvent selected from the group consisting of THF, DEC, and DIOX; or being a mixture of DMC, DMA and a solvent selected from the group consisting, of DMSO, NMP, MG, GBL, TEP, EC, DME, PC, MF, THF, SULF, ACN, MA, DEC, DIOX, DEE, EA, and DMSU, or being a mixture of DMC, DMSO and a solvent selected from the group consisting of NMP, MG, GBL, TEP, EC, DME, PC, MF, THF, SULF, ACN, MA, DEC, DIOX, DEE, EA, and DMSU; or being a mixture of DMC, NMP and a solvent selected from the group consistinp of MG, GBL TEP, EC, DME, PC, MF, THF, SULF, ACN, MA, DEC, DIOX, DEE, EA, and DMSU; or being a mixture of DMC, MG and a solvent selected from the goup consisting of GBL, TEP, EC, DME, PC, MF, THF, SULF, ACN, MA, DEC, DIOX, DEE, EA, and DMSU; or being a mixture of DMC, GBL and a solvent selected from the group consisting of TEP, EC, DME, PC, MF, THF, ACN, MA, DEC, DIOX, and EA, or being a mixture of DMC, TEP and a solvent selected from the group consisting of EC, PC, SULF, and ACN; or beixig a mixture of DMC, EC and either DME or DIOX, or being a mixture of DMC, DMB and ACN or being a mixture of DME, DMF and a solvent selected from the group consisting of DMA, DMSO, NMP, MG, GBL, TEP, EC, PC, MF, THF, SULF, DMC, ACN, MA, DEC, DIOX, DEE, EA, and DMSU; or being a mixture of DME, DMA and a solvent selected from the group consisting of DMSO, NMP, MG, GBL, TEP, EC, PC, MF, THF, SULF, DC, ACN, MA, DEC, DIOX, DEE, EA, and DMSU; or being a mixture of DME, DMSO and a solvent selected from the group consisting of NMP, MG, GBL, TEP, EC, PC, MF, THF, SULF, DMC, ACN, MA, DEC, DIOX, DE, EA, and DMSU; or being a mixture of DME, NMP and a solvent selected from the group consisting of MG, GBL, TEP, EC, PC, MF, THF, SULF, DMC, ACN, MA, DEC, DIOX, DEE, EA, and DMSU; or being a mixture of DME, MG and a solvent selected from the group consisting of GBL, TEP, EC, PC, MF, THF, SULF, DMC, ACN, MA, DEC, DIOX, DEE, EA, and DMSU: or being a mixture of DME, GBL and a solvent selected from the group consisting of TEP, EC, PC, MF, THF, SULF, DMC, ACN, MA, DEC, DIOX, DEE, EA, and DMSU; or being a mixture of DME, TEP and a solvent selected from the group consisting of EC, PC, SULF, ACN, and DMSU; or being a mixture of DME, EC and a solvent selected from the group consisting Of MF, THF, SULF, DMC, ACN, MA, DEC, DIOX, DEE, EA, and DMSU; or being a mixture of DME, PC and a solvent selected from the group consisting of THF, DEC, and DIOX; or being, a mixture of DME, MF and either SULF or ACN; or being a mixture of DME, THF and either SULF or ACN; or being a mixture of DME, SULF and either DEC or DIOX, or being a mixture of DME, DMC and ACN, or being a mixture of DME, ACN and a solvent selected from the zroup consisting of MA, DEC, DIOX, DEE, EA, and DMSU.

19. The battery of claim 17 wherein the electrode is a porous electrode comprising particles of an electrode-active material, a highly fluorinated lithium ion exchange polymer and at least one aprotic solvent selected from the group consisting of dimethyl formmide (DMF) dimethpxyethane (DME), ethylene carbonate (EC), propylene carbonate (PC), dimethyl stilfoxide (DMSO), gamma-butyroplactone (GBL), N,N'-dimethylpropyleneurea (DMPU), 1-mothyl-2-pyrrolidone (NMP), dimethyl acetamide (DMA), N,N'-dimcthyl butvrarnide (DMB), triethylphopsjhate-(TEP), n,n'-di-n-butylacetamide (DBA), and mixtures thereof or being a mixture of PC with a solvent selected from the group consisting of DME, EC, GBL, dimethyl carbonate (DMC), and acrylonitrile (ACN); or being a mixture of EC with a solvent selected from the group consisting of DME, GBL, DMSO, diethoxyethanie (DEE), and DMC; or being a mixture of NMP with a solvent selected from the group consisting of DME, DMSO, GBL, DMF, and DMA; or being a mixture of GBL with DEE or DME; being a mixture of EC and DME with a solvent selected from the group consisting of diethyl carbonate (DEC), DMC, and PC or being a mixture of DMF and a solvent selected from the a group consisting of DMA, DMSO, NMP, methvl glycolate (MG), GBL, TEP, EC, DME, PC, methyl formate (MF), tetrahydrofliran (THF), sufolarie (SULF), DMC, ACN, methyl acetate (MA), DEC, 1,3-dioxolane (DIOX), DEE, ethyl acrvlate (EA), aNd dimethy sulfite (DMSU); or being a mnixture of DMA and a solvent selected from the group consisting of DMSO, NMP, MG, GBL, TEP, EC, DME, RC, MF, THF, SULF, DMC, ACN, MA, DEC, DIOX, DEE, EA, and DMSU; or being a mixture of DMSO and a solvent selected from the group consisting of NMP, MG, GBL, TEP, EC, DME, PC, MF, THF, SULF, DMC, ACN, MA, DEC, DIOX, DEE, EA, and DMSU, or being a mixture of NMP and a solvent selected from the group consisting of MG, GBL, TEP, EC, DME, PC, MF, THF, SULF, DMC, ACN, MA, DEC, DIOX, DEE, EA, and DMSU; or being a mixture of MG and a solvent selected from the group consisting of GBL, TEP, EC, DME, PC, THF, SULF, DMC, ACN, MA, DEC, DIOX, DEE, EA, and DMSU; or being a mixture of GBL and a solvent selected from the group consisting of TEP, EC, DME, PC, MF, THF, ACN, MA, DEC, DIOX, and EA; or being a mixture of TEP and a solvent selected from the group consisting of EC, PC, SULF, ACN, and DMSU; or being a mixture of EC and DME; or being a mixture of DME and either ACN or DMSU or being a mnixture of EC, DMF and a solvent selected from the group consisting of DMA, DMSO, NMP, MG, GBL, TEP, DME, PC, MF, THF, SULF, DMC, ACN, MA, DEC, DIOX, DEE, EA, and DMSU; or being a mixture of EC, DMA and a solvent selected from the group consisting of DMSO, NMP, MG, GBL, TEP, DME, PC, MF, THF, SULF, DMC, ACN, MA, DEC, DIOX, DEE, EA, and DMSU; or beinga mixture of EC, DMSO and a solvent selected from the group consisting of NMP, MG, GBL, TEP, DME, PC, MF, THF, SULF, DMC, ACN, MA, DEC, DIOX, DEE, EA, DMSU, or being a mixture of EC, NMP and a solvent selected from the group consisting of MG, GBL, TEP, DME, PC, MF, THF, SULF, DMC, ACN, MA, DEC, DIOX, DEE, EA, and DMSU; or being a mixture of EC, MG and a solvent selected from the goup consisting of GEL, TEP, DME, PC, MF, THF, SULF, DMC, ACN, MA, DEC, DIOX, DEE, EA, and DMSU; or being a mixture of EC, GBL and a solvent selected from the group, comsisting of TEP, DME, PC, MF, THF, SULF, DMC, ACN, MA, DEC, DIOX, DEE, EA, and DMSU; or being a mixture of EC, TEP and a solevent selected from the group consisting of DME, PC, MF, THF, SULF, DMC, ACN, MA, DEC, DIOX, DEE, EA, and DMSU; or being a mixture of EC, DME and a solvent selected from the group consisting of MF, THF, SULF, DMC, ACN, MA, DEC, DIOX, DEE, EA, and DMSU; or being a mixture of EC, MF and either DEC or DIOX; or being a mixture of EC, THF and either DEC or DIOX; or being a mixture of EC, DMC and DIOX; or being a mixture of EC, DEC and DIOX, or being a mixture of PC, DMF and a solvent selected from the group consisting of DMA, DMSO, NMP, MG, GBL, TEP, EC, DME, MF, THF, SULF, DMC, ACN, MA, DEC, DIOX, DEE, EA, and DMSU; or being a mixture of EC, DMA and a solvent selected from the group consisting of DMSO, NMP, MG, GBL, TEP, EC, DMR, MF, THF, SULF, DMC, ACN, MA, DEC, DIOX, DEE, EA, and DMSU; or being a mixture of PC, DMSO and a solvent selected from the group consisting of NMP, MG, GBL, TEP, EC, DME, MF, THF, SULF, DMC, ACN, MA, DEC, DIOX, DEE, EA, and DMSU; or being a mixture of PC, NMP and a solvent selected from the group consisting of MG, GBL, TEP, EC, DME, MF, THF, SULF, DMC, ACN, MA, DEC, DIOX, DEE, EA, and DMSU; or being a mixture of PC, MG and a solvent selected from the group consisting of GBL, TEP, EC, DME, MF, THF, SULF, DMC, ACN, MA, DEC, DIOX, DEE, EA, and DMSU; or being a mixture of PC, GBL and a solvent selected from the group consisting of TEP, EC, DME, MF, THF, DMC, ACN, MA, DEC, DIOX, DEE, EA, and DMSU; or being a mixture of PC, TEP and a solvent selected from the group consisting of EC, DME, MF, THF, SULF, DMC, ACN, MA, DEC, DIOX, DEE, EA, and DMSU; or being a mixture of PC, DME and a solvent selected from the group consisting of THF, DEC, and DIOX; or being a miixture of DMC, DMA and a solvent selected from the group consisting of DMSo, NMP, MG, GBL, TEP, EC, DME, PC, MF, THF, SULF, ACN, MA, DEC, DIOX, DEE, EA, and DMSU; or being a mixture of DME, DMSO and a solvent selected from the group consisting of NMP, MG, GBL, TEP, EC, mixture of DMC, NMP and a solvent selected from the group consistiny, of MG, GBL, TEP, EC, DME, PC, MF, THF, SULF, ACN, MA, DEC, DIOX, DEE, EA, and DMSU; or being a mixture of DMC, MG and a solvent selected from the group consisting of GBL, TEP, EC, DME, PC, MF, THF, SULF, ACN, MA, DEC, DIOX, DEE, EA, and DMSU; or being a mixture of DMC, GBL and a solvent selected from the group consisting of TEP, EC, DME, PC, MF, THF, ACN, MA, DEC, DIOX, and EA; or being a mnixtue of DMC, TEP and a solvent selected from the group consisting of EC, PC, SULF, and ACN; or being a mixture of DMC, EC and either DME or DIOX; or being a mixture of DMC, DME and ACN or being a mixture of DME, DMF and a solvent selected from the group consisting of DMA, DMSO, NMP, MG, GBL, TEP, EC, PC, MF, THF, SULF, DMC, ACN, MA, DEC, DIOX, DEE, EA, and DMSU; or being a mixture of DME, DMA and a solvent selected from the group consisting of DMSO, NMP, MG, GBL, TEP, EC, PC, MF, THF, SULF, DMC, ACN, MA, DEC, DIOX, DEE, EA, and DMSU; or being a mixture of DME, DMSO and a solvent selected from the group consisting of NMP, MG, GBL, TEP, EC, PC, MF, THF, SULF, DMC, ACN, MA, DEC, DIOX, DEE, EA, and DMSU; or being a mixture of DME, NMP and a solvent selected from thlzopp consisting of MG, GBL, TEP, EC, PC, MF, THF, SULF, DMC, ACN, MA, DEC, DIOX, DEE and DMSU; or being a mixture of DME, MG and a solvent selected from the group consisting of GBL, TEP, EC, PC, MF, THF, SULF, DMC, ACN, MA, DEC, DIOX, DEE, EA, and DMSU; or being a mixture of DME, GBL and a solvent selected from the group consisting of TEP, EC, PC, MF, THF, SULF, DMC, ACN, MA, DEC, DLOX, DEE, EA, and DMSU; or being a mixture of DME, TEP and a solvent selected from the group consisting of EC, PC, SULF, ACN, and DMSU; or being a mixture of DME, EC and a solvent selected from the group consisting of MF, THF, SULF, DMC, ACN, MA, DEC, DIOX DEE, EA, and DMSU; or being a mixture of DME, PC and a solvent selected from the erouo consisting of THF, DEC, and DIOX, or being a mixture of DME, MF, and either SULF or ACN; or being a mixture of DME, THF and either SULF or ACN; or being a mixture of DME, SULF and either DEC, or DIOX; or being a mixture of DME, DMC and ACN; or being a mixture of DME, ACN and a solvent selected from the group consisting of MA, DEC, DIOX, DEE, EA, and DMSU.

20. A process for forming an electrode the process comprising
forming a solution or dispersion of a highly fluorinated polymer having a pendant fluoroalkoxy lithium sulfonate or sulfonyl fluoride group;
mixing into the solution or dispersion an electrode active material in particulate form to form a coating paste;
forming a film from the coating paste;
coalescing the polymer in the film by the application of heat;
and, if the pendant group is a sulfonyl fluoride, hydrolyzing the polymer to a lithium ionomer.

21. The process of claim 20 wherein the polymer has a pendant fluoroalkoxy lithium sulfonate group and the solvent is a mixture of propylene carbonate and an alcohol.

22. The FLIEPEM of claim 8 wherein the non-ionic perfluoro-olefin monomer is selected from the group consisting of tetrafluoroethylene (TFE), hexafluoropropylene, vinyl fluoride, vinylidine fluoride, trifluoroethylene, chlorotrifluoroethylene, perfluoro (alkyl vinyl ether), and mixtures thereof.

23. The FLIEPEM of claim 8 wherein the copolymer is formed from TFE and a perfluorovinyl monomer having a pendant group represented by the formula:

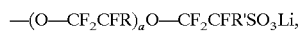

wherein R and R' are independently selected from F, Cl or a perfluorinated alkyl group having 1 to 10 carbon atoms, a=0, 1 or 2.

24. The FLIEPEM of claim 23 wherein R is $CF_3$, R' is F, and a=0 or 1.

25. The FILIEPEM of claim 24 wherein a=1.

26. The FLIEPEM of claim 8 having an equivalent weight in the range of 600–1500 grams/equivalent.

27. The FILIEPEM of claim 26 having an equivalent weight in the range of 900–1200 grams/equivalent.

28. The process of claim 11 or 12 wherein the polymer is a copolymer comprising at least 50 mol-% of a non-ionic perfluoro-olefin monomer.

29. The process of claim 28 wherein the non-ionic perfluoro-olefin monomer is selected from the group consisting of tetrafluoroethylene (TFE), hexafluoropropylene, vinyl fluoride, vinylidine fluoride, trifluoroethylene, chlorotrifluorocthylene, perfluoro (alkyl vinyl ether), and mixtures thereof.

30. The process of claim 28 wherein the copolymer is formed from TFE and a perfluorovinyl monomer having a pendant group represented by the formula:

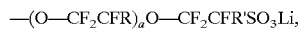

wherein R is $CF_3$, R' is F and a=0 or 1.

31. The process of claim 11 or claim 12 wherein the FLIEPM is contacted with at least two aprotic solvents further comprising a first solvent contacting step followed by at least one additional solvent contacting step.

* * * * *